(12) United States Patent
Winzer

(10) Patent No.: US 8,526,831 B2
(45) Date of Patent: Sep. 3, 2013

(54) RECEIVER ALGORITHMS FOR COHERENT DETECTION OF POLARIZATION-MULTIPLEXED OPTICAL SIGNALS

(75) Inventor: Peter J. Winzer, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 458 days.

(21) Appl. No.: 12/642,762

(22) Filed: Dec. 18, 2009

(65) Prior Publication Data

US 2011/0150477 A1 Jun. 23, 2011

(51) Int. Cl.
*H04B 10/06* (2006.01)

(52) U.S. Cl.
USPC .......................................................... 398/209

(58) Field of Classification Search
USPC ........................................ 398/202, 208–209
See application file for complete search history.

(56) References Cited

U.S. PATENT DOCUMENTS

| | | | |
|---|---|---|---|
| 5,793,818 A | 8/1998 | Claydon et al. | |
| 6,191,649 B1 | 2/2001 | Sugita et al. | |
| 6,654,719 B1 | 11/2003 | Papadias | |
| 7,269,356 B2 | 9/2007 | Winzer | |
| 7,639,761 B2 | 12/2009 | Chu et al. | |
| 7,822,350 B2 | 10/2010 | Liu | |
| 8,073,345 B2 | 12/2011 | Chen et al. | |
| 8,155,534 B2 | 4/2012 | Winzer | |
| 2008/0291335 A1 | 11/2008 | Markman | |
| 2010/0111531 A1 | 5/2010 | Tanimura et al. | |
| 2010/0135482 A1* | 6/2010 | Jagannathan et al. | ... 379/406.06 |
| 2010/0158521 A1 | 6/2010 | Doerr et al. | |
| 2011/0142449 A1 | 6/2011 | Xie | |

* cited by examiner

*Primary Examiner* — Leslie Pascal
(74) *Attorney, Agent, or Firm* — Hitt Gaines, PC

(57) ABSTRACT

A digital signal processor (DSP) operating within, for example, an optical receiver wherein the DSP processes complex sample streams derived from a received modulated optical signal, the DSP configured to perform a method comprising: processing at least one block of symbols within a complex symbol stream to define a received constellation having symbols located within decision boundaries; and verifying that the received constellation does not exhibit errors by comparing the received constellation to each of a sequence of reference constellations having corresponding phase shifts within an angular ambiguity range of the first constellation.

19 Claims, 13 Drawing Sheets

700

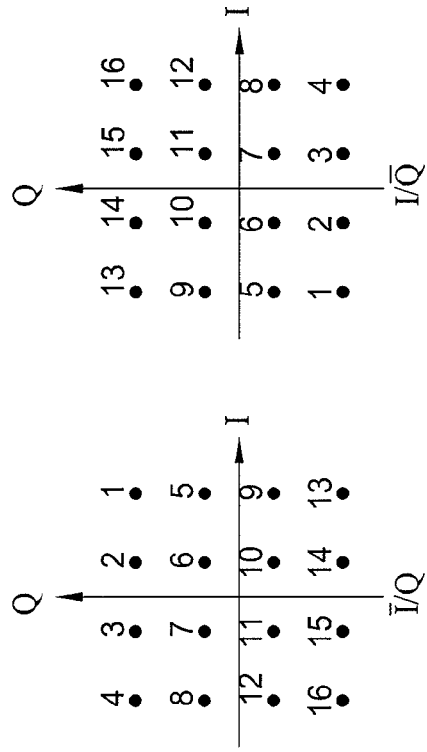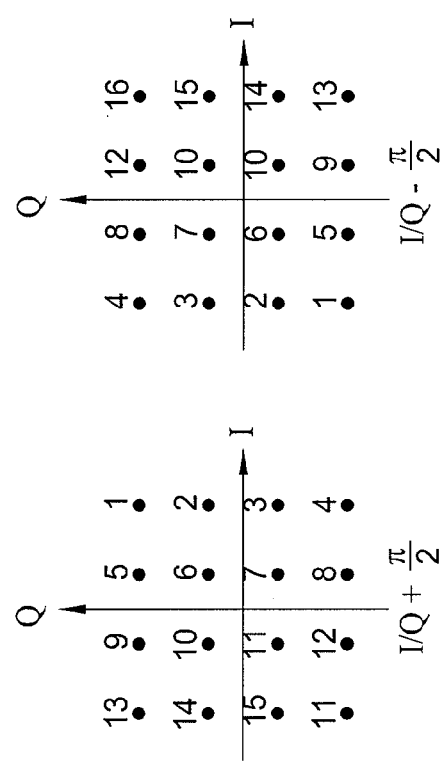

16-PSK
4 bits/symbol

8-PSK
3 bits/symbol

RECEIVER ALGORITHMS FOR COHERENT DETECTION OF POLARIZATION-MULTIPLEXED OPTICAL SIGNALS

CROSS-REFERENCE TO RELATED APPLICATIONS

This application is related to U.S. patent application Ser. Nos. 12/642,764 and 12/642,7645 entitled "RECEIVER ALGORITHMS FOR COHERENT DETECTION OF POLARIZATION-MULTIPLEXED OPTICAL SIGNALS," each of which is incorporated by reference herein in its entirety.

FIELD OF THE INVENTION

The invention relates to optical communications systems and, more particularly, wavelength division multiplexed (WDM) optical communications systems utilizing complex modulation.

BACKGROUND

Polarization division multiplexed quadrature phase shift keying (PDM-QPSK) is considered an attractive option for 100-Gb/s optically routed wavelength division multiplexed (WDM) transport systems. PDM-QPSK provides a spectral efficiency SE of about 3.2 bits/s/Hz in point-to-point applications using direct detection, and about 2.0 bits/s/Hz in an optically routed environment using coherent detection, where SE is defined as the net per-channel bitrate Rb divided by WDM channel spacing Δf. That is, PDM-QPSK enables an optically-routed networking at 100 Gb/s on a 50-GHz WDM grid (SE of 2.0 bits/s/Hz).

Due to the continuing growth in bandwidth demands, it is desirable to provide optically routed transport systems well above 100 Gb/s with SEs well above 2 bits/s/Hz.

SUMMARY

These and various other deficiencies of the prior art are addressed by a digital signal processor (DSP) operating within, for example, an optical receiver wherein the DSP processes complex sample streams derived from a received modulated optical signal, the DSP configured to perform a method comprising: processing at least one block of symbols within a complex symbol stream to define a received constellation having symbols located within decision boundaries; and verifying that the received constellation does not exhibit errors by comparing the received constellation to each of a sequence of reference constellations having corresponding phase shifts within an angular ambiguity range of the first constellation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the Figures.

DETAILED DESCRIPTION

The invention will be primarily described within the context of optically routed wavelength division multiplexed (WDM) transport systems including transmitters and receivers using polarization division multiplexing (PDM) to convey data modulated according to a complex modulation scheme, illustratively 16 point quadrature amplitude modulation (QAM). Those skilled in the art and informed by the teachings herein will realize that the invention is also applicable to other modulation schemes as well as to non-PDM signals.

The specific embodiments discussed herein are primarily directed to an exemplary optical transport network conveying data at a rate of 112 Gb/s using PDM, 16-QAM at 14 Gbaud. Various embodiments provide long-haul optically-routed networking on a 25-GHz WDM grid, and point-to-point transmission on a 16.6-GHz grid, yielding an advantageously high SE of 6.2 b/s/Hz for single-carrier 112-Gb/s signals. Other embodiments are also contemplated by the inventor; some of these embodiments are described in further detail below.

Figure 1:
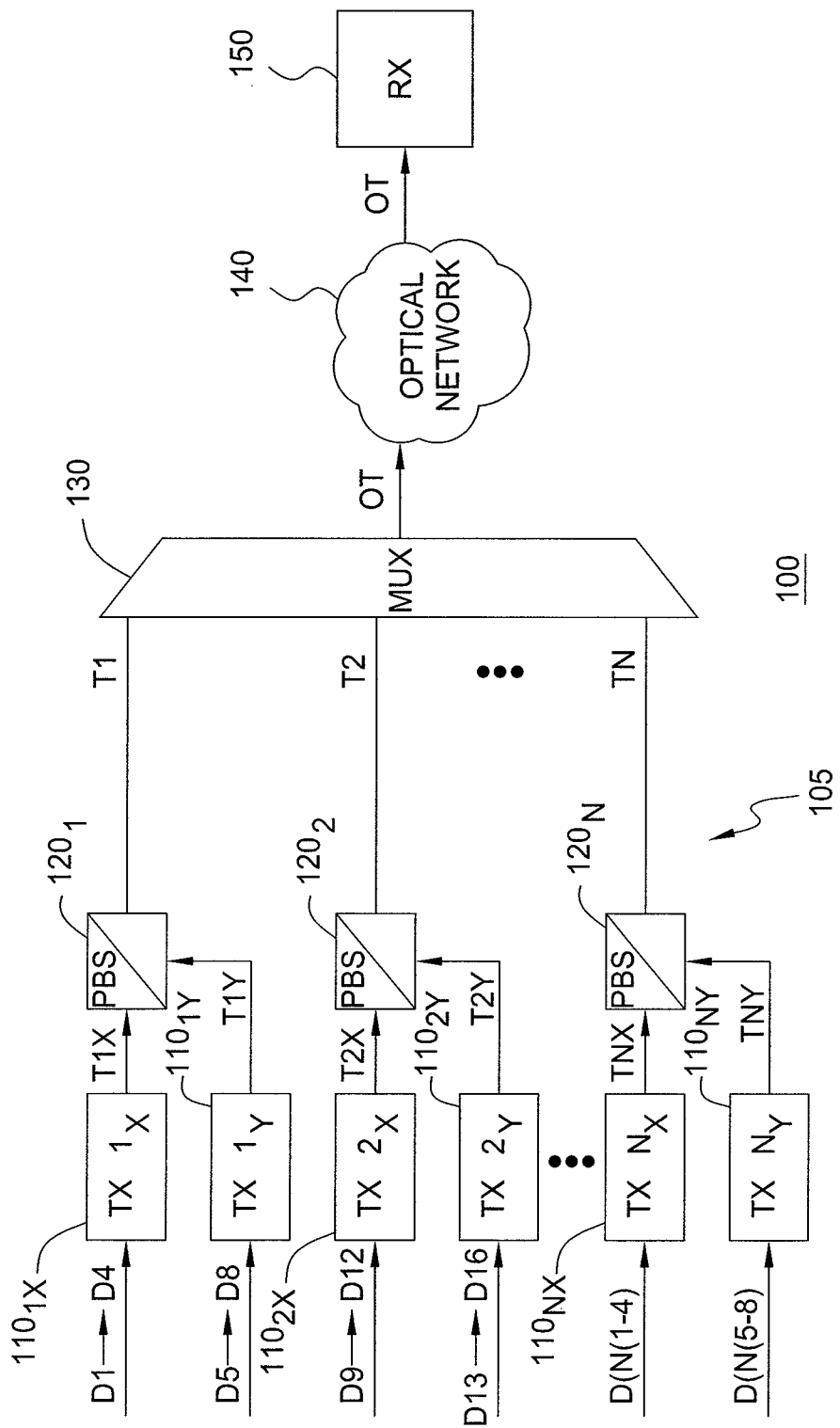
FIG. 1 depicts a high level block diagram of an optical transport system according to one embodiment.

FIG. 1 depicts a high level block diagram of an optical transport system according to one embodiment. Specifically, the optical transport system 100 of FIG. 1 comprises optical transmitter equipment 105, an optical network 140 and an optical receiver 150. It will be appreciated by those skilled in the art that the various elements discussed herein are greatly simplified for purposes of this discussion. Standard functional elements, such as repeaters, shapers, control circuits and the like which are generally included within an optical transport system are not discussed in detail herein.

The optical transmitter equipment 105 comprises a plurality (N) of modulators/transmitters 110 arranged in modulators/transmitter pairs $110_{1X}$, $110_{1Y}$ through $110_{NX}$, $110_{NY}$ (collectively modulator/transmitters 110). Each of the individual modulators/transmitters 110 receives and encodes a plurality of data channels (illustratively four) to responsibly provide in-phase and quadrature components of a multi-level modulated output signal (illustratively a 16-QAM output signal). More or fewer data channels may be processed by each of the modulators/transmitters 110, depending upon the type of modulation employed and size of constellation desired. For example, the various embodiments may utilize many different modulation techniques, such as rectangular QAM, regular or irregular star-QAM, circular QAM, phase shift keying (PSK), amplitude shift keying (ASK), orthogonal frequency-division multiplexing (OFDM) and the like. Additionally, the different modulation techniques used may comprise smaller constellations (e.g., 8-QAM) or larger constellations (e.g., 256-QAM) than the exemplary sized constellations discussed herein. Additionally, the different modulation techniques used may utilize differential encoding or non-differential encoding techniques. Other modifications will be known to those skilled in the art and informed by the teachings of the present invention.

A 16-QAM embodiment of a modulator/transmitter 110 will be discussed below with respect to FIG. 2.

A first four data channels (D1-D4) are processed by a first modulator/transmitter $110_{1X}$ to provide a 16-QAM encoded optical output signal T1X, which is coupled to a first input of a first polarization beam splitter (PBS) $120_1$. A second four data channels (D5-D8) are processed by a second modulator/transmitter $110_{1Y}$ to provide a 16-QAM encoded optical output signal T1Y, which is coupled to a second input of the first PBS $120_1$. The first PBS $120_1$ operates to orthogonally combine the first T1X and second T1Y 16-QAM encoded optical output signals to obtain a polarization multiplexed optical signal T1.

A third four data channels (D9-D12) are processed by a third modulator/transmitter $110_{2X}$ to provide a 16-QAM encoded optical output signal T2X, which is coupled to a first input of a second PBS $120_2$. A fourth four data channels (D13-D16) are processed by a fourth modulator/transmitter $110_{2Y}$ to provide a 16-QAM encoded optical output signal T2Y, which is coupled to a second input of the second PBS $120_2$. The second PBS $120_2$ operates to orthogonally combine the third T2X and fourth T2Y 16-QAM encoded optical output signals to obtain a polarization multiplexed optical signal T2.

As described above, each of a first and second pair of modulator/transmitters 110 processes eight data signals or bit streams to provide respective first and second pairs of 16-QAM encoded optical signals. The encoded optical signal pairs are orthogonally combined by respective first and second polarization beam splitters to provide respective first and second polarization division multiplexed optical signals T1 and T2.

Generally speaking, any number N of transmitter/modulator pairs may be employed along with the respective PDMs to obtain any number of combined or polarization multiplexed optical signals. Thus, FIG. 1 also depicts an optional Nth pair of modulator/transmitters 110 processing Nth pairs of four channel digital data streams to obtain an Nth polarization multiplexed optical signal optical signal TN.

The polarization multiplexed optical signals T1-TN are combined by an optical wavelength multiplexer 130 to provide a wavelength-division multiplexed (WDM) optical transport signal OT. In one embodiment, the multiplexer is part of the optical transponder. In other embodiments, it is part of a different functional element such as an optical add/drop node (ROADM), in which embodiment the transponder optionally drops and adds one or more WDM channels at particular wavelengths to an already existing WDM multiplex. The optical transport signal OT is conveyed by the optical network 140 to one or more receivers 150, illustratively a polarization-division demultiplexing coherent receiver. An embodiment of a receiver 150 will be discussed below with respect to FIG. 3. It will be appreciated that only one receiver 150 is shown for subversive discussion, more receivers 150 may be used within the context of the present embodiments.

Figure 2:
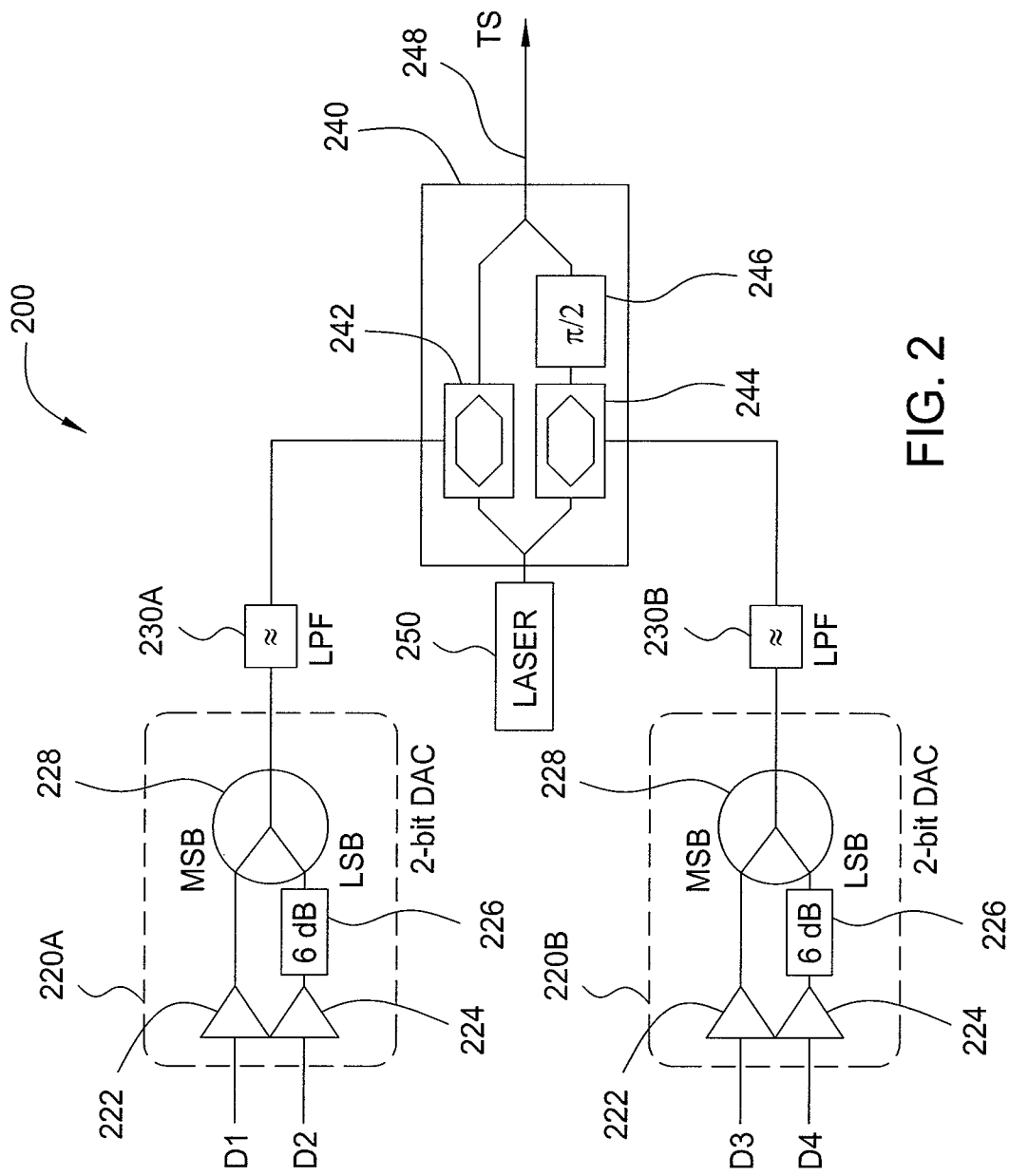
FIG. 2 depicts a high level block diagram of a transmitter suitable for use in the system of FIG. 1.

FIG. 2 depicts a high level block diagram of a modulator/transmitter suitable for use in the system of FIG. 1. Specifically, the modulator/transmitter 200 of FIG. 2 is suitable for use in implementing a 16-QAM embodiment of the modulator/transmitters 110 discussed above with respect to the system 100 FIG. 1. The transmitter 200 of FIG. 2 may be modified to provide other types of modulation and/or use other symbol sizes as discussed elsewhere in this specification. In one embodiment, the transmitter 200 of FIG. 2 is implemented according to the teachings of U.S. patent application Ser. No. 12/164,519, filed Jun. 30, 2008, which is incorporated herein by reference in its entirety.

The transmitter 200 of FIG. 2 receives, illustratively for a 16-level modulation format such as 16-QAM, four separate, if desired cross-coded binary bit streams denoted as binary streams D1, D2, D3 and D4. The binary streams are processed in pairs by respective digital-to-analog converters (DACs) 220. For each pair of binary streams (e.g., D1/D2, D3/D4), one of the binary signals is interpreted as a most significant bit (MSB) of the binary drive bitstream of the two-bit DAC 220, while the other is attenuated by, illustratively, 6 dB and interpreted as a least significant bit (LSB) binary drive bitstream of the two-bit DAC 220.

Specifically, a first two-bit DAC 220A processes a first pair of binary signals D1 and D2, while a second two-bit DAC 220B processes a second pair of binary signals D3 and D4. Each of first 220A and second 220B two-bit DACs comprises a first amplifying element 222 for generating an amplified MSB signal in response to respective first binary signals (e.g., D1, D3), and a second amplifying element 224 for generating an amplified LSB signal in response to respective second binary signals (e.g., D2, D4). The amplified LSB signal is attenuated by 6 dB using the attenuator 226. The MSB signal and the attenuated LSB signal are coupled to a combiner 228 to provide a two-bit DAC output signal (i.e., an analog output signal having any of four different electrical amplitude levels).

An eye diagram (not shown) of the output signal of either DAC 220 would show the two four-level signals making up the in-phase (I) and quadrature-phase (Q) components of the exemplary 16-QAM symbol, respectively. In one embodiment, the peak-to-peak voltage of the four-level signals is approximately 3.5 Volts.

The output signals provided by the first 220A and second 220B DACs are coupled to respective input ports of, illustratively, an integrated LiNbO$_3$ double-nested Mach-Zehnder (I/Q) modulator 240. Optionally, to electrically suppress modulation sidelobes, the output signals provided by the first 220A and second 220B DACs are filtered by respective low pass filters (LPFs) 230A and 230B and then coupled to the modulator 240.

The modulator 240 comprises a first double-nested Mach-Zehnder structure 242 for receiving and processing the output signal from the first DAC 220A, and a second double-nested Mach-Zehnder structure 242B for receiving and processing the output signal from the second DAC 220B. Each of the double-nested Mach-Zehnder structures 242, 244 processes its respective DAC output signal in accordance with an optical signal provided by an optical source 250, illustratively a C-band tunable external cavity laser (ECL) or a distributed feedback (DFB) laser.

The output signal of the first double-nested Mach-Zehnder structure 242 is provided directly to an output coupler 248 as an in-phase signal, while the output signal of the second double-nested Mach-Zehnder structure 244 is delayed by phase delay 246 and then provided to output coupler 248 as a quadrature-phase signal. Output coupler 248 combines the in-phase output signal and quadrature-phase output signal to provide a transmitter output signal TS, which corresponds to the output signals of the modulators/transmitters 110 of FIG. 1.

While the transmitter/modulator 200 of FIG. 2 is described within the context of a 16-QAM transmitter (i.e., processing 4-bits per symbol), the transmitter 200 may be modified to provide any QAM or other complex modulation constellation (i.e., processing more or fewer bits per symbol) by, illustratively, modifying the DACs to process more than two bit streams, using more or fewer DACs to process two or more bitstreams each and so on.

Figure 3:
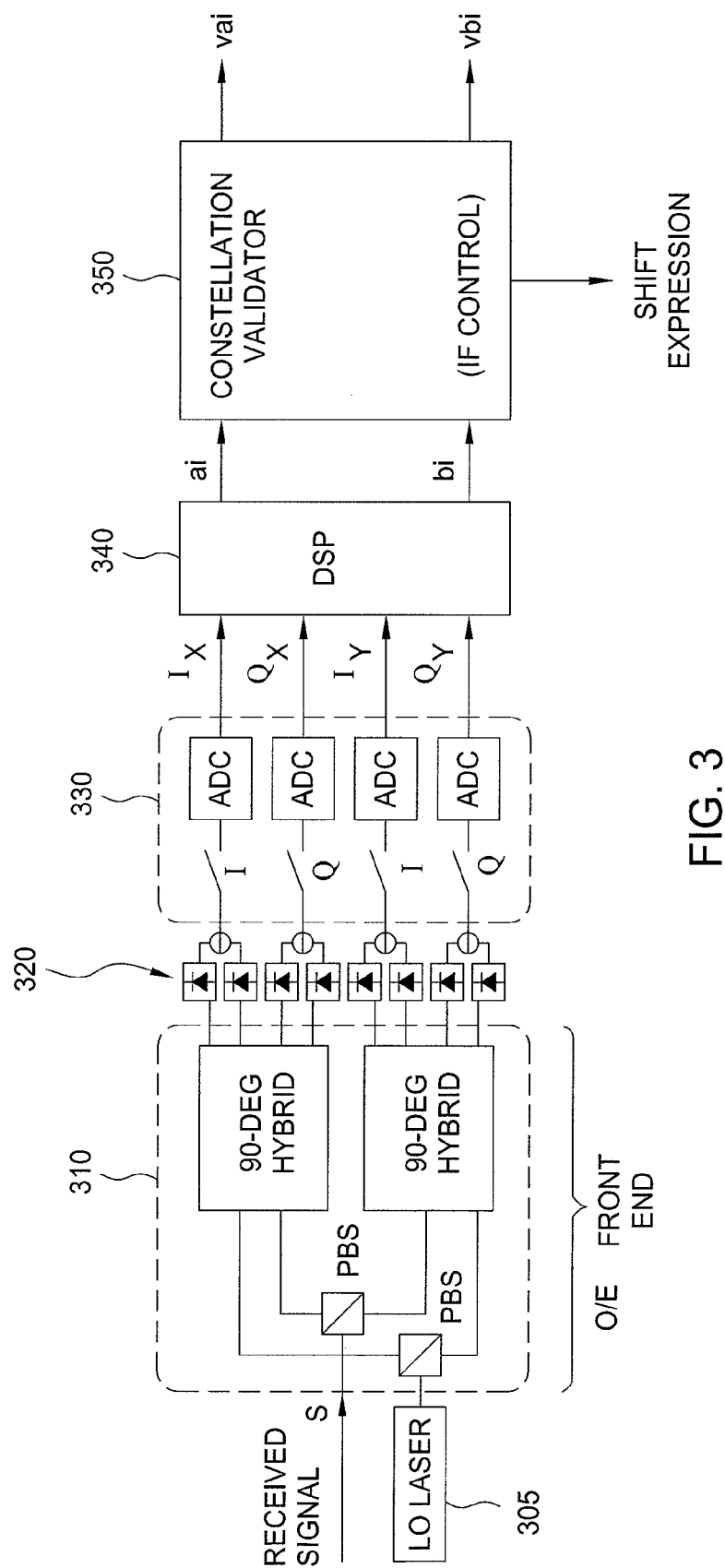
FIG. 3 depicts a high level block diagram of a polarization-diversity coherent receiver suitable for use in the system of FIG. 1.

FIG. 3 depicts a high level block diagram of a polarization-diversity coherent receiver suitable for use in the system of FIG. 1. Specifically, the receiver 300 of FIG. 3 is an intradyne receiver that includes an opto-electronic front-end portion (305-330) for receiving an optical signal S, illustratively a polarization multiplexed optical signal such as the signal T1 generated by a PBS 120 in the transmitter 100 depicted above with respect to FIG. 1. The intradyne receiver 300 extracts, from the received optical signal S, in-phase and quadrature phase components of each of two polarizations of the transmitted symbol streams. The receiver 300 also includes a digital signal processing (DSP) unit (340) for digitally processing the extracted sample streams to retrieve therefrom the transmitted data.

Optionally, the receiver 300 includes a constellation validation processor 350 for validating the received constellation (i.e., determining whether the received constellation exhibits the correct rotation and that the in-phase and/or quadrature-phase data has not been inverted). The constellation validation processor may be implemented as a functional element or portion of the DSP 340 or a standalone functional element 350 as depicted in FIG. 3, or it may be integrated with any further processing blocks, such as for example a subsequent forward error correction (FEC) unit or an optical transport network (OTN) framing/deframing unit, both of which are not shown in the figure.

Opto-Electronic Receiver Front-End

The opto-electronic front-end portion receives the optical signal S from, illustratively, an optical network such as the optical network 170 discussed above with respect to FIG. 1. The opto-electronic front-end portion comprises, illustratively, an optical hybrid device 310 such as a polarization-diversity 90-degree optical hybrid, a plurality of optical detectors 320 such as high-speed semiconductor photodetectors, and a plurality of sampling and digitizing units including, for example sample and hold (S/H) amplifiers and analog to digital converters (ADCs) 330.

The optical hybrid device 310 splits the received optical signal S into two portions via, illustratively, a first polarization beam splitter (PBS). The optical hybrid device 310 splits a local oscillator laser signal LO into two portions via, illustratively, a second polarization beam splitter (PBS). In one embodiment, the polarization-diversity 90-degree optical hybrid is implemented according to the teachings of U.S. patent application Ser. No. 12/338, 492, which is incorporated herein by reference in its entirety.

The local oscillator laser signal LO may be generated using a laser source such as described previously. Alternatively, the LO signal may be generated using a portion of a transmit laser such as described in U.S. Pat. No. 7,269,356, which is incorporated herein by reference in its entirety. The LO is tuned, in one embodiment, to within approximately ±20 MHz of the received signal's center frequency.

First portions of the split optical signal S and local oscillator laser signal LO are combined or mixed by a first 90-degree optical hybrid to provide respective first in-phase (Ix) and quadrature-phase (Qx) mixed optical signals. Second portions of the split optical signal S and local oscillator laser signal LO are combined or mixed by a second 90-degree optical hybrid to provide respective second in-phase (Iy) and quadrature-phase (Qy) mixed optical signals. The four mixed optical signals $I_X$, $Q_X$, $I_Y$, $Q_Y$ are output from the optical hybrid as, illustratively, four conjugate optical signal pairs. The four conjugate optical signal pairs are then sampled by the eight optical detectors 320, forming four pairs of balanced photodetectors. Their four output signals are asynchronously digitized by the ADC converters 330 to provide corresponding digital sample streams $I_X$, $Q_X$, $I_Y$, $Q_Y$ for further processing by the DSP 340.

While the first and second optical output signals are depicted as balanced optical signals, it will be appreciated by those skilled in the art that non-balanced and/or other optical signals may be employed to implement the functionality described herein with respect to the optical hybrid device 310. Moreover, while the optical hybrid device 310 is depicted as a separate component from the analog to digital converters 330, it will be appreciated by those skilled in the art that in some embodiments, both functions are implemented on a common substrate or within a common functional element.

The four pairs of output signals from the 90-degree optical hybrid 310 are illustratively received by the optical detectors 320 and asynchronously sampled and digitized by the ADC converters 330 at 50 GSamples/s using nominal 8-bit resolution of the analog-to-digital converters (ADCs) and a frequency-dependent effective number of bits (ENoB) between 4 and 5. However, the inventor contemplates that other sample rates (large or smaller than 50 GSamples/s), other nominal resolutions (larger or smaller than 8-bit resolution), and/or other effective numbers of bits (larger or smaller than 4 or 5) may be used within the context of the present embodiments.

Operation of the DSP 340 will be discussed in more detail below with respect to FIGS. 4 and 5. Operation of the optional constellation validator 350 will be discussed in more detail below with respect to FIGS. 6 and 7.

Receiver Digital Signal Processing

Figure 4:
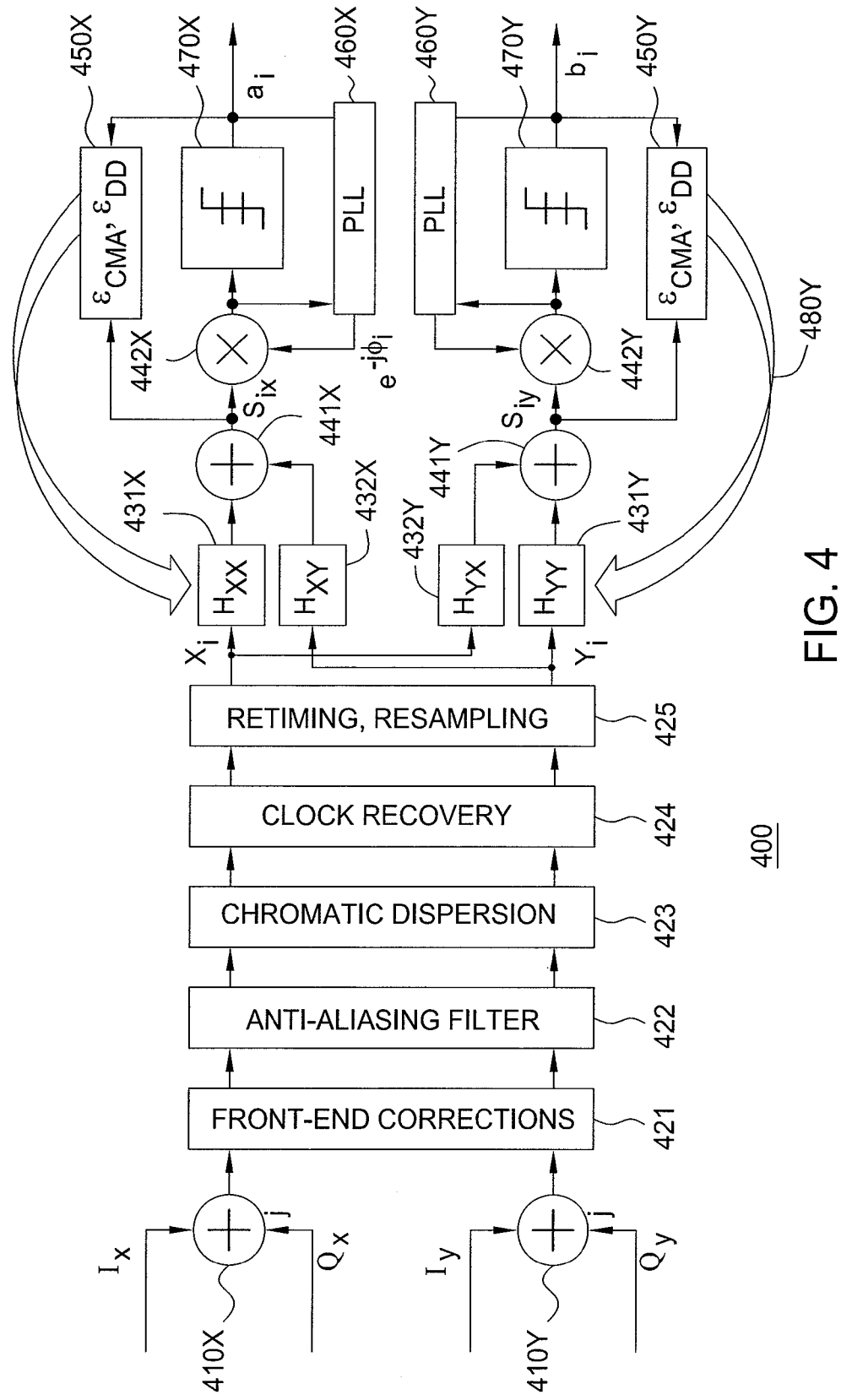
FIG. 4 depicts a high level block diagram of an exemplary digital signal processing (DSP) unit suitable for use within the receiver of FIG. 3.

FIG. 4 depicts a high level block diagram of digital signal processing (DSP) unit suitable for use within the receiver of FIG. 3. Specifically, the DSP 400 of FIG. 4 is suitable for use in implementing the functions of DSP 340 of FIG. 3.

As previously noted, the specific embodiments discussed herein are primarily directed to an exemplary optical transport network conveying data at a rate of 112 Gb/s using PDM 16-QAM at 14 Gbaud. Thus, and as will appreciated by one skilled in the art, various parameters discussed below with respect to DSP operation will require adequate modification to implement different data rates, different constellation types, and so on.

Initial DSP Functions

Referring to FIG. 4, the four sample streams $I_X$, $Q_X$, $I_Y$, $Q_Y$ received from, illustratively, the ADCs 330 are interpreted as real and imaginary parts (I and Q) of two complex sample streams (X and Y), one for each polarization.

The DSP 400 is configured or programmed to perform an algorithm including a first or initial plurality of functions, including a front-end correction function 421, an anti-aliasing filter function 422, a chromatic dispersion function 423, a clock recovery function 424, a retiming and resampling function 425. The specific implementation of the individual functions within the first plurality of functions is very flexible in the present embodiments. Different implementations may be used to implement the various functions as known to those skilled in the art and in conjunction with the teachings of the present disclosure.

In a first step, the DSP algorithm performs a front-end correction function 421 comprising ac coupling and correction for specific (static) optical front-end errors, such as a sampling skew between I and Q signal components or phase errors within the 90-degree hybrid.

In a second step, the DSP algorithm performs an anti-aliasing filter function 422. It is noted that the specific anti-aliasing filter shape has little impact on the performance of the receiver; rectangular filter shapes, Gaussian filter shapes and other filter shapes may be used to implement this function. In some embodiments, anti-aliasing filtering is omitted.

In a third step, the DSP algorithm performs a bulk chromatic dispersion (CD) filter function to compensate for dispersion of the transmission line. This linear filter function is illustratively implemented in the frequency domain using fast Fourier transforms (FFT) and multiplication with the quadratic spectral phase characteristic of CD.

In a fourth step, the DSP algorithm performs a clock recovery function in which a clock frequency is recovered on a block of data by taking the FFT of the input signal power waveform and detecting the pronounced, illustratively, 14-GHz tone (assuming a 14-Gbaud symbol rate).

In a fifth step, the DSP algorithm uses the recovered clock frequency to synchronously down-sample the as of yet asynchronously sampled input signal to, illustratively, a synchronous 28 GSamples/s (2× oversampling at 1/T=14 Gbaud), albeit with a yet unknown clock phase.

Subsequent DSP Functions

After performing the above first or initial plurality of functions, the DSP algorithm performs an additional or subsequent set of functions, including:

Source separation to adaptively restore the original x and y polarizations of the transmit signal from the randomly rotated receive signal polarizations.

Adaptive equalization to counter randomly varying channel impairments.

Recovery of the correct sampling phase.

Frequency recovery to compensate for the residual rotation of the equalized constellation diagram due to the non-zero intermediate frequency (IF), i.e., the beat frequency between signal and LO laser.

Phase recovery to align the received constellation with the decision boundaries of the underlying modulation format, such as a rectangular grid of decision boundaries that are optimum for QAM detection in the presence of circularly symmetric noise. It should be noted that in the context of synchronization techniques for digital receivers, frequency and phase estimation are often treated together under the name of carrier phase recovery.

Adaptive Source Separation and Equalization

Referring to FIG. 4, adaptive source separation, equalization, and sampling phase recovery are simultaneously performed by a lattice filter with transfer functions Hxx(f), Hxy(f), Hyx(f), and Hyy(f), which represents the frequency-dependent inverse Jones matrix of the transmission channel. Each filter block is implemented in the time domain as a finite impulse response (FIR) filter with N=16 fractionally-spaced (T/2) taps, which has been determined by the inventor to be sufficient to allow for reliable operation under a pulse broadening of up to approximately 3 symbols. Different lengths of FIR filters are also possible, depending on the trade-off between implementation complexity and equalization benefits.

The DSP 400 of FIG. 4 provides for blind filter adaptation (i.e., adaptation without the use of a training sequence) using a filter adaption algorithm (FAA) such as a constant modulus algorithm (CMA) for filter pre-convergence and a decision-directed algorithm for final convergence and tracking, though other adaptation algorithms may also be used within the context of the present embodiments. Such other algorithms comprise, illustratively, Richardson-Lucy deconvolution, Bussgang methods, polyspectra techniques, decision-directed algorithms and the like.

The CMA is a blind filter adaptation algorithm that is simple, robust, and works independent of carrier frequency and phase, both of which are initially not available to the receiver. In essence, the CMA minimizes the time-averaged error $\epsilon$CMA reflecting the average distance of the equalized received symbols $s_i$ (where i is the symbol time index) at the output of the filter from a single circle of radius R in the complex plane ('constant modulus'), as per the following equation:

$$\langle \epsilon \text{CMA} \rangle = \langle R^2 - |S_i|^2 \rangle, \quad \text{(eq. 1)}$$

where <.> represents a temporal average.

The filter coefficients are adapted according to the following equation, which minimizes $\epsilon$CMA:

$$h^k \mapsto h^k + \mu \epsilon_{CMA} x^*_{i-k} s_i \quad \text{(eq. 2)}$$

Where $h^k$ represents either $h_{xx}^k$, $h_{xy}^k$, $h_{yx}^k$ or $h_{yy}^k$ and denotes the $k^{th}$ filter tap of any one of the four FIR filters; $x_{i-k}^*$ denotes the (complex conjugate) signal at the equalizer input at time step i-k, and $\mu$ is a convergence parameter, illustratively selected as $10^{-2}$ for the exemplary receiver.

The CMA adaptation algorithm works particularly well for (single ring) PSK constellations, where it is often the only adaptation algorithm used. However, for QAM constellations, which are generally composed of multiple rings (such as the three rings for 16-QAM), the time averaged filter adaptation error will likely not be reduced to zero by the CMA. However, minimizing the error adjusts the filter taps such that the equalized constellation becomes reasonably compact, which yields sufficient pre-convergence such that the receiver may confidently switch to, e.g., decision-directed (DD) equalization.

In one embodiment, the default starting condition for the CMA comprises unit impulses for $h_{xx}$ and $h_{yy}$ as follows:

$$(h_{xx}^k = h_{yy}^k = \frac{1}{\sqrt{2}} \text{ for } k = \{N/2, N/2+1\}$$

and all zeros for $h_{xy}$ and $h_{yx}$. As will be discussed in more detail below, this starting condition does not always provide reliable convergence of the FAA, such as the CMA. To ensure reliable convergence, the inventor has addressed the adaptation convergence problem in various embodiments by changing the starting conditions of the adaptation algorithm by stepping through a sequence of unitary (polarization) rotation matrices Frequency and Phase Estimation After FAA (e.g., CMA) pre-convergence, the received signal is reasonably well decomposed into its two polarizations and is roughly equalized within each polarization. However, the constellation is still spinning at the intermediate frequency IF, it may be wiggling due to laser phase noise, and it is rotated to a random phase angle compared to the desired decision boundaries, illustratively a rectilinear grid that is aligned with the real and imaginary axes.

Figures 5A, 5B:
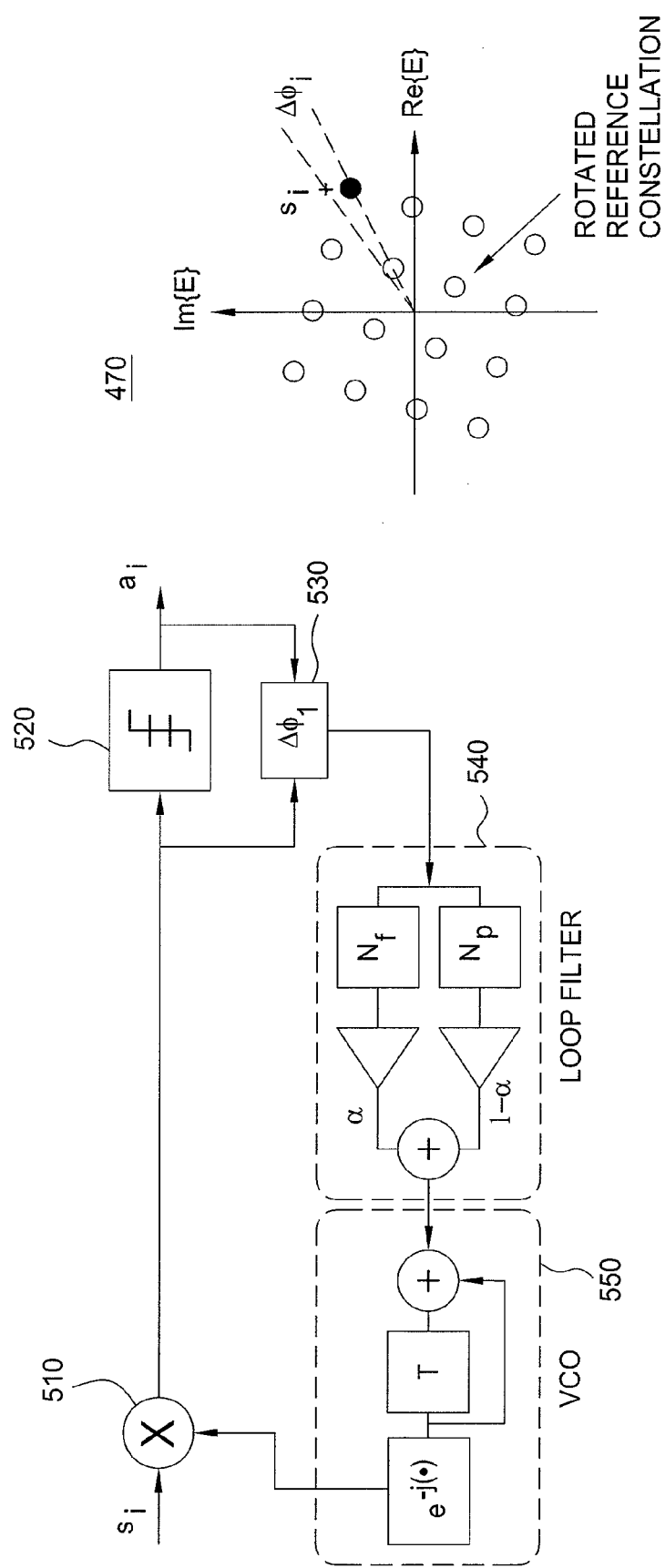
FIG. 5 depicts a high level block diagram of an exemplary decision-directed phase locked loop (PLL) suitable for use in the various embodiments.

FIG. 5B graphically depicts a received or input constellation (post convergence) exhibiting a rotation offset error. Specifically, FIG. 5B depicts a 16-QAM constellation that is slightly tilted or rotated by an amount $\Delta\phi_i$ such that the actual symbol locations are not aligned with the decision regions of the 16-QAM constellation. To align the symbol locations with the decision regions it is necessary to "untilt" or "unrotate" the input constellation by approximately the same amount $\Delta\phi_i$. For errors due to phase noise, the rotation angle $\Delta\phi_i$ averaged over many symbols reveals the constellation's phase offset. For errors due to a frequency offset, each symbol is rotated by another $\Delta\phi_i$ compared to the previous symbol, where $\Delta\phi_i=2\pi\Delta f$ is the uncompensated frequency. Hence, $\Delta\phi_i$ contains information on both phase noise and frequency offset.

In the present embodiments, a block of received symbols $S_j$ representing an input constellation is compared to each of a plurality of rotated reference constellations. Each of the plurality of rotated reference constellations is rotated (with respect to a nearest rotation constellation) by fine angles within the constellation's angular ambiguity range. For example, if the constellation's angular ambiguity range is $\pi/2$ (such as for rectangular QAM constellations), the number of reference constellations may comprise, illustratively, 10 constellations, rotated in angular increments of $\pi/20$. More or fewer rotated constellations may be used (i.e., the ambiguity range may be divided by a number larger or smaller than 10), depending on the accuracy needed for convergence. The number of reference constellations may also be adapted to the signal quality (noise, distortion, frequency offset, etc.) during operation.

When a reference constellation is found to match or to be closest to the input constellation (e.g., in the sense of a least means squared (LMS) error or another suitable technique), either the received signal constellation is derotated by an amount corresponding to the rotation of the best-matching reference constellation. (Equivalently, the decision regions can be rotated corresponding to the best-matching reference constellation.)

The rotation angle associated with the best-matching reference constellation provides information sufficient to determine the phase and frequency of the received or input constellation. This method may either provide good starting values for phase error and frequency offset for a subsequent PLL, or it may itself act as a self-standing PLL and FLL during operation and in this respect may take the place of the PLL 460 shown in FIG. 4.

Generally speaking, for each of the rotated reference constellations, the average error of all symbols in the block of symbols is determined. The rotated constellation exhibiting the least means squared error is defined as a match for locking purposes.

Various embodiments use a frequency locking mechanism (FLM) to process a sequence of equalized received symbols $S_i$ representing a constellation of unknown rotation and possibly of unknown in-phase and/or quadrature-phase signal inversions to provide a sequence of decision samples $a_i$, $b_i$ representing a constellation that has been locked to a grid associated with the various decision boundaries that are inherent to the constellation. Though primarily described within the context of a DDPLL, the FLM may comprise a phase locked loop (PLL), decision directed PLL (DDPLL) or any other frequency locking mechanism that may be implemented within the context of the DSP.

FIG. 5A depicts a high level block diagram of a decision-directed phase locked loop (PLL) suitable for use in the various embodiments. The DDL-PLL 500 of FIG. 5A is suitable for use in implementing the PLL functions depicted with respect to the DSP 400 of FIG. 4.

The PLL function is implemented by the DSP 400 using multiplier 442, decision (data slicer) 470 and PLL element 460 (e.g., loop filter and a voltage controlled oscillator (VCO) function.

It is noted that the resolution of the input stream $S_i$ provided to the PLL function of the DSP 400 is much finer than the resolution of the output stream ($a_i$, $b_i$) provided by the PLL function. That is, the pre-slicer resolution is finer than the post-slicer resolution.

Referring to FIG. 5A, multiplier 442 of FIG. 4 is implemented by multiplier 510 of FIG. 5A; decision (data slicer) 470 of FIG. 4 is implemented by decision (data slicer) 520 of FIG. 5A; and PLL function 460 of FIG. 4 is implemented by phase difference 530, loop filter 540 and VCO 550.

In one embodiment, in order to achieve frequency lock and phase alignment, the decision-directed PLL 500 of FIG. 5A is used to process a block of symbols, such as a block of approximately 1000 symbols. It can be seen that the loop filter is implemented as a running average over, respectively, $N_p$ and $N_f$ samples of a phase difference $\Delta\phi i$ between the pre-decision and post-decision signal samples, and the weighted output (weighting factor $0<\alpha<1$) of the two integrators is used as the input to the digital voltage-controlled oscillator (VCO). In various embodiments the parameter $\alpha$ is selected as approximately 0.95. The integration time constants are chosen on the order of $N_p\sim10$ for phase estimation and $N_f\sim1000$ for frequency estimation. Any other suitable filter functions, such as Wiener loop filters, are also possible embodiments.

In one embodiment, in order to find the correct phase angle, the DD-PLL 500 steps through, illustratively, 10 reference constellations, rotated in increments of $\pi/20$. In various embodiments, more or fewer constellations may be used and/or more or fewer rotational increments may be used. The rotation angle of the reference constellation that exhibits the smallest mean-square error is then selected. This process corresponds to a maximum likelihood (ML) search for the correct phase angle while simultaneously estimating the IF.

After initial frequency and phase lock, the decision-directed PLL continues its operation, interleaved with DD filter adaptation. The above-described processing provides complex sample streams ($a_i$, $b_i$) mapping onto a (hopefully) stable constellation, such as an orthogonally presented QAM or differential QAM constellation. However, the constellation represented by the complex sample complex streams ($a_i$, $b_i$) may not be stable or correct in the sense that the symbol-to-binary demapping is always necessarily right, even if all loops are in a locked state.

Specifically, any blind equalization and phase recovery process will produce a stable constellation to within an unknown angular offset corresponding to the angular ambiguity (or angular frequency) of the underlying constellation. For example, a 16-QAM constellation looks the same if rotated by $\pi/2$, and hence the equalization and phase recovery may lock onto any of the four different constellation rotations $\{0, \pi/2, \pi, 3pi/2\}$. The same is true if the offset frequency happens to be at a value that rotates any given QAM constellation point by any integer relationship of $\pi/2$ within one symbol period (e.g., multiplied or divided by an integer value). As such, in various embodiments, further processing is provided to determine which of a plurality of possible constellations is the correct one for subsequent symbol-to-binary data decoding. Moreover, the constellation may be inverted over one or more of its axis.

Method to Provide Reliable Filter Convergence

Part of the contribution by the inventor is the recognition of a problem in that for some input polarization states, convergence of a filter adaptation algorithm (FAA) is sometimes insufficient, either because the filter adaptation algorithm does not converge at all or converges exceedingly slowly. Within the context of the various embodiments, a constant modulus algorithm (CMA) will be used as an exemplary FAA. However, it will be appreciated that other FAAs may be used, such as Richardson-Lucy deconvolution, Bussgang methods, polyspectra techniques, decision-directed algorithms and the like, and that these other FAAs are also contemplated by the inventor to find utility within the context of the various embodiments.

To ensure reliable convergence, the inventor has determined that stepping through a sequence of starting conditions such that all polarization input states on the Poincare sphere are reasonably covered, provides reliable locking of the filter adaptation algorithm. Specifically, the adaptation convergence problem is addressed in various embodiments by changing the starting conditions of the adaptation algorithm by stepping through a sequence of unitary (polarization) rotation matrices, such as described below:

$$\begin{pmatrix} h^k_{xx} & h^k_{xy} \\ h^k_{yx} & h^k_{yy} \end{pmatrix} = \frac{1}{\sqrt{2}} \begin{pmatrix} e^{j\varphi}\cos\vartheta & e^{-j\varphi}\sin\vartheta \\ -e^{j2\varphi}\sin\vartheta & \cos\vartheta \end{pmatrix} \quad \text{(eq. 3)}$$

for $k = \{N/2, N/2 + 1\}$ and with $$\varphi \in \left[0; \frac{\pi}{4}\right] \text{ and } \vartheta \in [0; \pi]$$

Specifically, the inventor has determined that in the case of CMA-based adaptation, even with fairly coarse ($\pi/8$) steps for the two angles, yielding a total of 24 possible initial conditions, pre-convergence is reliably obtained for all input polarization states. Depending on the modulation format and other system parameters, one may choose to use more or less than 24 possible initial conditions. The step size of $\pi/8$ is sufficient to project a substantially uniform (though coarse) grid forming three rings on a Poincare sphere, which is generally a sufficiently fine step size within the context of the above equations.

In one embodiment, the rotation matrices used are provided, in a more general form, as follows:

$$\begin{pmatrix} h^k_{xx} & h^k_{xy} \\ h^k_{yx} & h^k_{yy} \end{pmatrix} = \frac{1}{\sqrt{2}} \begin{pmatrix} e^{ja}\cos\vartheta & e^{jb}\sin\vartheta \\ e^{j(\pi+a-b)}\sin\vartheta & \cos\vartheta \end{pmatrix} \quad \text{(eq. 4)}$$

In one embodiment, the rotation matrices used are the real-valued rotation matrix provided as follows:

$$\begin{pmatrix} h^k_{xx} & h^k_{xy} \\ h^k_{yx} & h^k_{yy} \end{pmatrix} = \frac{1}{\sqrt{2}} \begin{pmatrix} \cos\vartheta & \sin\vartheta \\ -\sin\vartheta & \cos\vartheta \end{pmatrix} \quad \text{(eq. 5)}$$

Various other rotation matrices may be used.

In the exemplary embodiments detailed in this application, FAA (illustratively, CMA) pre-convergence is followed by obtaining an initial estimate of carrier frequency offset and symbol phase, and filter adaptation is switched to decision directed (DD) operation.

In one embodiment, DD operation is provided using a least-mean squares (LMS) adaptation with an error signal $\epsilon_{DD,standard}=|ai-e^{-j\phi}s_i|^2$, where $\phi$ is the correct angular back-rotation following frequency and phase tracking.

In one embodiment, DD operation is provided using a least-mean squares (LMS) adaptation with a phase-independent error signal together with the corresponding filter update algorithm. The phase-independent error signal is of the following form depicted in eq. 6, while the filter update algorithm is of the form depicted in eq. 7, where $\mu$ is typically chosen on the order of $10^{-2}$ to $10^{-4}$:

$$\epsilon_{DD}=|a_i|^2-|s_i|^2 \quad \text{(eq. 6)}$$

$$h^k \mapsto h^k + \mu\epsilon_{DD}x^*_{i-k}s_i \quad \text{(eq. 7)}$$

This filter adaptation is interleaved with a decision-directed phase locked loop (PLL), as discussed in more detail below with respect to FIG. 5A. Note that the decisions $a_i$ are based, illustratively, on the (optimum) standard rectilinear grid of QAM decision boundaries rather than on radial decision boundaries; only the error signal is based, illustratively, on radial information, which decouples the equalizer update from residual phase tracking errors within the PLL. The decisions a; and/or the error signal may be based on other factors.

Method to Validate Constellations

Part of the contribution by the inventor is the recognition of a problem in that prior to outputting valid data, the constellation processed by the receiver must not only have the correct rotation in order to output valid data upon subsequent symbol-to-binary data mapping, but it must also be tested if a drive signal inversion ('conversion error') has occurred at the transmitter. Both effects will be described in more detail below. Thus, in various embodiments, a short known reference pattern is tested to determine the correct rotation of the signal constellation as well as to identify conversion errors associated with either of the two quadratures that may occur during modulation. This functionality may be provided within the DSP itself, in any subsequent signal processing unit (such as an FEC or an OTN deframer), or via an optional constellation validation processor, an example of which will be described below with respect to FIG. 7.

A first ambiguity is denoted as a rotation error. Such an error occurs for all complex symbol constellations that have some degree of rotational symmetry, i.e., symbol constellations that are invariant to rotations of less than $2\pi$. For example, square constellations such as 16-QAM may be rotated by $\pi/2$ to reproduce the exact same symbol constellation, albeit with a different bit-to-symbol mapping. ASK/PSK formats may show an even larger number of ambiguity angles. For example, an 8-PSK constellation may be rotated by $\pi/4$ to produce the same constellation with a different symbol mapping, resulting in 8 possible rotations that need to be checked by the transmitter. Only one of these possible rotations corresponds to the correct bit-to-symbol assignment.

In optical communications, higher-order modulation formats, such as for example 16-QAM, are generated using a double-nested Mach-Zehnder modulator, leading to a second class of ambiguities. This second ambiguity is denoted as a conversion error, wherein one of the quadratures has been inverted to reproduce the same symbol constellation but with a different bit-to-symbol mapping. Specifically, the inventor has determined that within the context of optical communications the sign of an optical field depends on the bias point of an interferometer, such that the modulated optical signal may represent either the drive signal or the inverted drive signal. Therefore, in order to find the correct bit-to-symbol mapping, the exemplary 16-QAM receiver has to check for 8 possible ambiguous constellations: 4 rotations plus the inversion of one of the two quadratures in all 4 possible rotations. The inversion of both quadratures corresponds to a 180-deg rotation and is determined by the rotation ambiguity algorithm, as long as a rotation of π is one of the possible ambiguity angles (which it is for square QAM constellations).

Figure 6J:
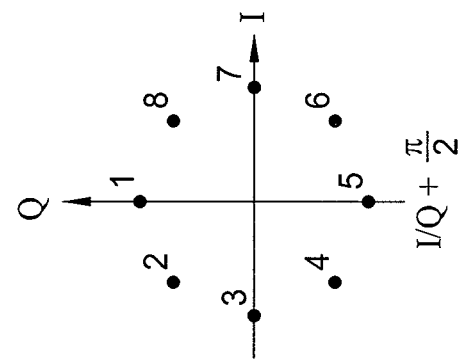
FIG. 6 graphically depicts a plurality of constellations suitable for use in understanding the various embodiments.
Figure 6I:
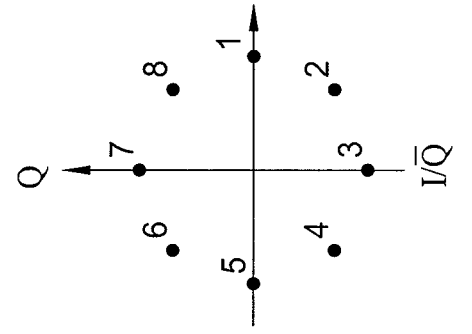
Figure 6H:
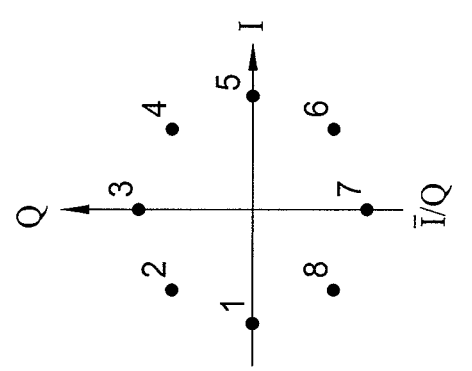

The constellations depicted in FIGS. 6A-6J visually depict correct and incorrect constellations, including rectangular (QAM) and circular (PSK) constellations as examples. For reference purposes, FIG. 6K depicts the corresponding Gray-coded bit-to-symbol mappings for 16-QAM, while FIG. 6L depicts the corresponding Gray-coded bit-to-symbol mappings for 8-PSK.

FIG. 6A depicts a 16-QAM constellation exhibiting the correct rotation and no in-phase or quadrature-phase inversion errors. The 16 points of the constellation have been arbitrarily indicated as shown.

FIG. 6B depicts the 16-QAM constellation exhibiting the correct rotation but a in-phase inversion error. That is, the constellation is flipped about the Q-axis.

FIG. 6C depicts the 16-QAM constellation exhibiting correct rotation, but also exhibiting a quadrature inversion error. That is, the constellation is flipped about the I-axis.

FIG. 6D depicts the 16-QAM constellation exhibiting a +90° (π/2) rotation error.

FIG. 6E depicts the 16-QAM constellation exhibiting a -90° (π/2) rotation error.

FIG. 6E depicts the 16-QAM constellation exhibiting a 180° (π) rotation error, which is equivalent to a correctly rotate constellation with both in-phase and quadrature-phase inversion errors.

Figure 6G:
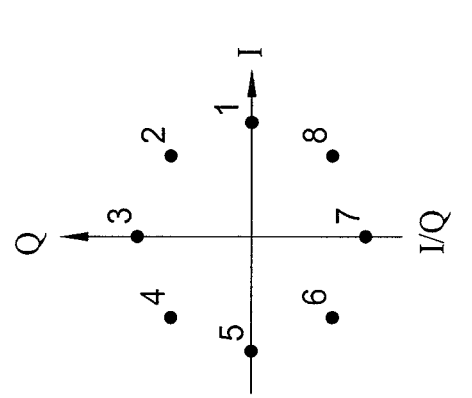
Figure 6K:
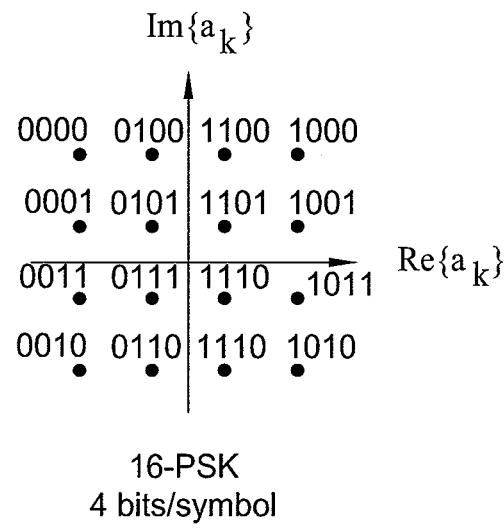
Figure 6L:
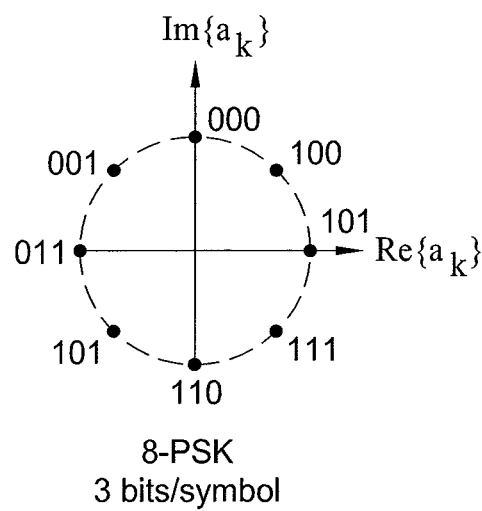

FIG. 6G depicts an 8 point circular constellation (8-PSK) exhibiting correct rotation and no in-phase or quadrature-phase inversion errors. The 8 points of the constellation have been arbitrarily numbered as shown.

FIG. 6H depicts the 8 point circular constellation exhibiting correct rotation, but also exhibiting an in-phase inversion error.

FIG. 6I depicts the 8 point circular constellation exhibiting correct rotation, but also exhibiting a quadrature-phase inversion error.

FIG. 6J depicts the 8 point circular constellation exhibiting a -90° (-π/2) rotation error.

For a receiver to provide valid data through the correct symbol-to-binary demapping, the constellation processed by the receiver must exhibit a correct rotation and have no in-phase or quadrature-phase inversion errors associated with it. More particularly, the still-encoded sample stream provided by the DSP to subsequent demodulation/processing elements (not shown in the various figures) must be corrected, either immediately after the DSP unit, or at another suitable stage within the processing chain, e.g., at an FEC stage or at an OTN deframing stage.

In one embodiment, a differential encoding scheme is used to counteract the rotation error problem. Specifically, information is encoded into the phase differences between symbol points such that specific rotations of the constellation become substantially irrelevant. However, since the use of differential encoding does not mitigate transmit quadrature inversion errors, testing for appropriate polarity is still necessary within this embodiment. Thus, various embodiments utilize differentially encoded QAM providing symbol streams forming rectangular and/or nonrectangular constellations. Thus, at the receiver, the retimed complex sample streams in this embodiment are derived from a received polarization division multiplexed (PDM), differentially encoded quadrature amplitude modulation (QAM) optical signal.

Figure 7:
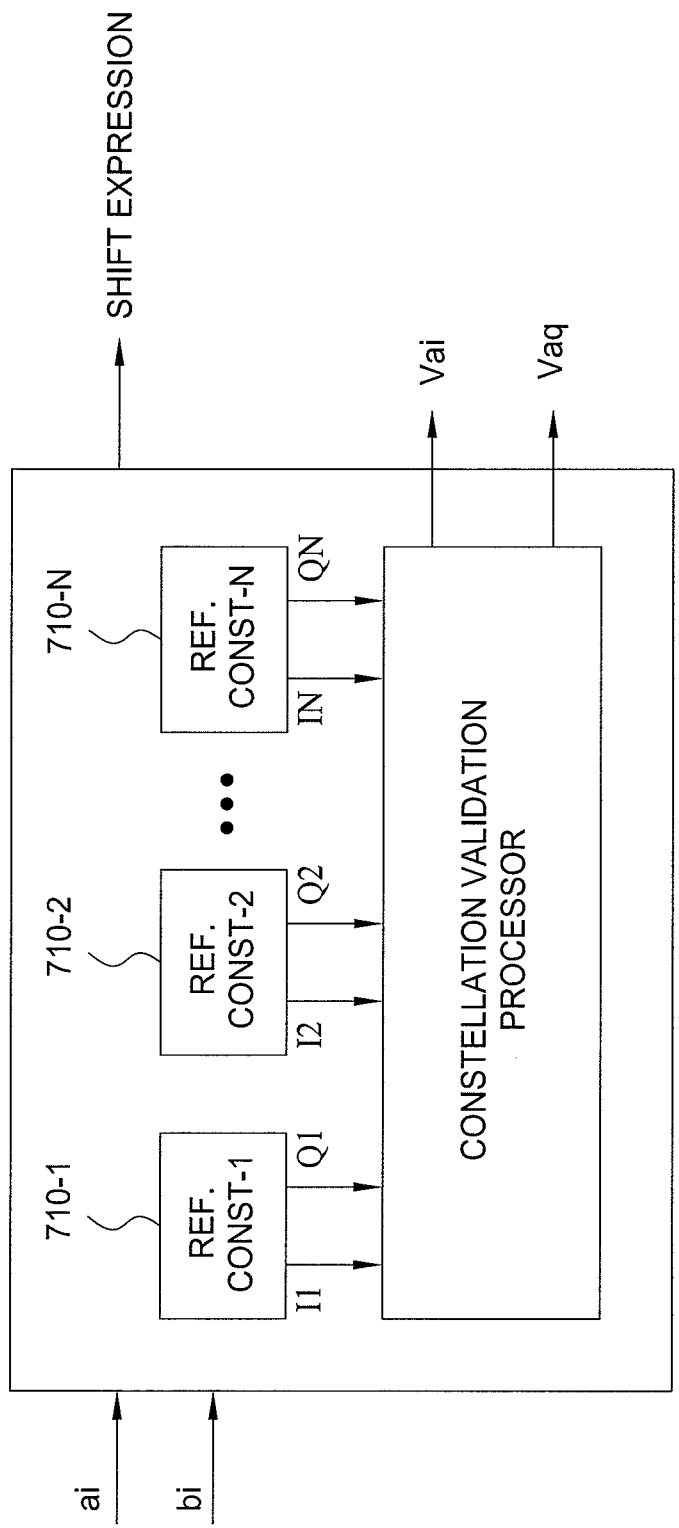
FIG. 7 depicts a high level block diagram of a constellation validator according to one embodiment.

FIG. 7 depicts a high level block diagram of a constellation validator according to one embodiment. The constellation validator 700 of FIG. 7 may be implemented within the DSP 400 of FIG. 4, within the DSP 340 of FIG. 3, within any of the subsequent signal processing units (e.g., FEC or OTN deframer), or as the standalone constellation validator 350 of FIG. 3.

Specifically, the constellation validator 700 receives and processes either or both of the complex symbol streams $a_i$ and $b_i$ provided by the DSP. Each of the complex symbol streams $a_i$ and $b_i$ represents a sequence of symbols that map onto a specific constellation, such as a 16-QAM constellation. Either or both of the complex symbol streams $a_i$ and $b_i$ may be processed by the constellation validator 700 to ensure that the symbol streams properly map onto their respective constellations.

The constellation validator 700 includes data representing a plurality of predefined reference constellations 710-1, 710-2 and so on through 710-N (collectively reference constellations 710). A constellation validation processor 720 receives one or both of the complex symbol streams $a_i$ and $b_i$ and responsibly compares received symbols to the reference constellations to identify which reference constellation is most likely the correct constellation. Reference constellation comparisons may be performed sequentially or in parallel.

The predefined reference constellations 710 include data associated with a predefined bit sequence or symbol sequence. This predefined bit sequence or symbol sequence is also received as part of complex symbol streams $a_i$ and $b_i$ such that the constellation validation processor 720 may quickly determine which of the plurality of reference constellations 710 represents the correct consolation for use in further processing the complex symbol streams $a_i$ and $b_i$.

In one embodiment, the constellation validation processor 720 operates to remap one or both of the complex symbol streams $a_i$ and $b_i$ validated complex symbol streams $va_i$ and $vb_i$.

In another embodiment, each of the reference constellations 710 comprises a respective processing unit or demodulator that extracts the initial data from the complex symbol streams $a_i$ and $b_i$. In this embodiment, the constellation validation processor 720 selects for output the data or symbol samples from the processing unit or demodulator associated with the correct reference constellation 710.

In various embodiments the constellation validator 700 provides one or both of the shift expression control signal, which control signal is used to adapt the intermediate frequency (IF) parameters associated with frequency loop locking mechanisms, such as described in more detail below with respect to FIG. 9.

The constellation validator 700 may be implemented using an application specific integrated circuit (ASIC), field programmable gate array (FPGA) or any other device capable of performing the symbol comparisons at an appropriate symbol rate. In various embodiments the received symbols are sequentially compared or mapped to the reference constellations 710 to identify which of the reference constellations 710 represents the correct constellation (i.e., constellation exhibiting correct rotation and having no inversion error).

In a 16-QAM embodiment, eight reference constellations are used; namely, one reference constellation for each of the four possible rotations and one for each of the four possible rotations including an inversion error. Optionally, 12 reference constellations may be used by additionally including one reference constellation for each of the four possible rotations having a different inversion error. Similarly, in an 8-PSK embodiment, 16 reference constellations are used; namely, one reference constellation for each of the eight possible rotations and one for each of the eight possible rotations including an inversion error.

In various embodiments described above, a specific bit pattern is included within a standard data packet, data frame or other data structure. The specific bit pattern is used to help determine whether constellation rotation or inversion errors exist. Moreover, once a constellation is validated, there may not be a need to perform further validation until a significant amount of time has passed. However, even if constant validation is desired (every one or more data packets or data frames), it is noted that the speed of an optical network formed according to various embodiments is so fast that the amount of time to process a number of symbols necessary to perform the constellation validation function is minimal.

The specific bit pattern may comprise a packet check sequence, frame check sequence, pseudorandom pattern, gold code or other pattern. Any pattern known to the receiver may be used. Generally speaking, any data structure such as a known field including therein known bit patterns that are mapped to a sufficient number of symbols in the underlying constellation may be used in the context of the constellation validation functions discussed herein.

Method to Search for Correct IF

Part of the contribution by the inventor is the recognition of a problem in that laser and local oscillator (LO) frequency tolerances may not be tight enough to always let the intermediate frequency (IF) fall within a spectral region inside of the frequency lock-in range of the receiving device. Every digital coherent receiver has a certain lock-in range in terms of the allowable IF, more particularly an allowable frequency difference between a received signal and a LO that constitutes the frequency with which the recovered constellation will spin in the complex plane. Some modulation formats and receiver algorithms exhibit a rather small tolerance for the allowable IF. For example, the above described 16-QAM recovery algorithm provides, in one embodiment, that signal and LO be within approximately +/−20 GHz for reliable locking of the phase locked loop (PLL).

Various embodiments provide additional processing as described below to address the case where the signal and LO lasers are not stable enough to keep them within the range for initial frequency locking.

Another aspect is based on the fact that an intermediate frequency (IF) offset of a constellation is equivalent to a phase shift over a symbol period. If the IF frequency offset is such that the phase rotates by one of the k ambiguity angles (e.g., $k*2\pi/4$ for square QAM or $k*2\pi/8$ for 8-PSK) or integer multiple (or divisible) thereof over one symbol period, then the frequency locked loop may lock onto an incorrect IF, offset from the true IF by integer multiples of $\Delta f=RS/k$, where RS is the symbol rate. The ambiguities from wrong IF locking may occur even for very large frequency lock-in ranges of the modulation format and the receiver algorithm.

For example, 16-QAM has an ambiguity angle of $\pi/2$. Thus, an integer multiple of a $\pi/2$-rotation within one symbol interval will lead to a perfectly recovered constellation, but no proper validation is possible since every symbol would require a differently rotated reference constellation. At 14 GBaud, such frequency ambiguities occur for IF offsets in integer multiples of 14/4=3.5 GHz. While this value is relatively large and may be well within the tolerances of typical lasers, modulation constellations with smaller ambiguity angles (such as for example 8-PSK) will have significantly smaller ambiguity frequency offsets that may be outside the tolerances of laser frequency stabilities and hence lead to problems in the frequency locking part of the receiver algorithm.

In various embodiments, the constellation validator also checks to determine whether the FLL has locked to an incorrect IF. If incorrect (per the validator or other mechanism), then the IF frequency is shifted up or down by integer multiples of RS/k until the constellation validator indicates that the correct constellation has been found.

Thus, in various embodiments, additional circuitry and/or DSP processing is provided to (a) validate if successful locking reported by the frequency locking loop actually corresponds to a constant and valid constellation rotation, and (b) selectively shift the signal into the correct lock-in spectral region, either by a continuous shift or in discrete steps corresponding to the ambiguity frequency.

Specifically, in one embodiment the receiver implements an additional function wherein it steps through several adjacent frequency intervals (i.e., spectral regions) to determine which one produces lock-in of the PLL. That is, potential signal energy from each of a plurality of spectral regions proximate the lock-in region of the PLL is selectively shift it into the lock-in spectral region.

In another embodiment, the receiver shifts the frequency compensating for an IF offset by integer multiples of the ambiguity frequency $f_{AMB}=RS/K$, where RS is the symbol rate and K is the number of angular ambiguity states within $\{0$ to $2\pi\}$, to determine the correct IF together with the constellation validation mechanism outlined herein. As noted elsewhere, there are four angular ambiguity states for QAM and eight angular ambiguity states for amplitude shift keying (ASK).

Figure 8:
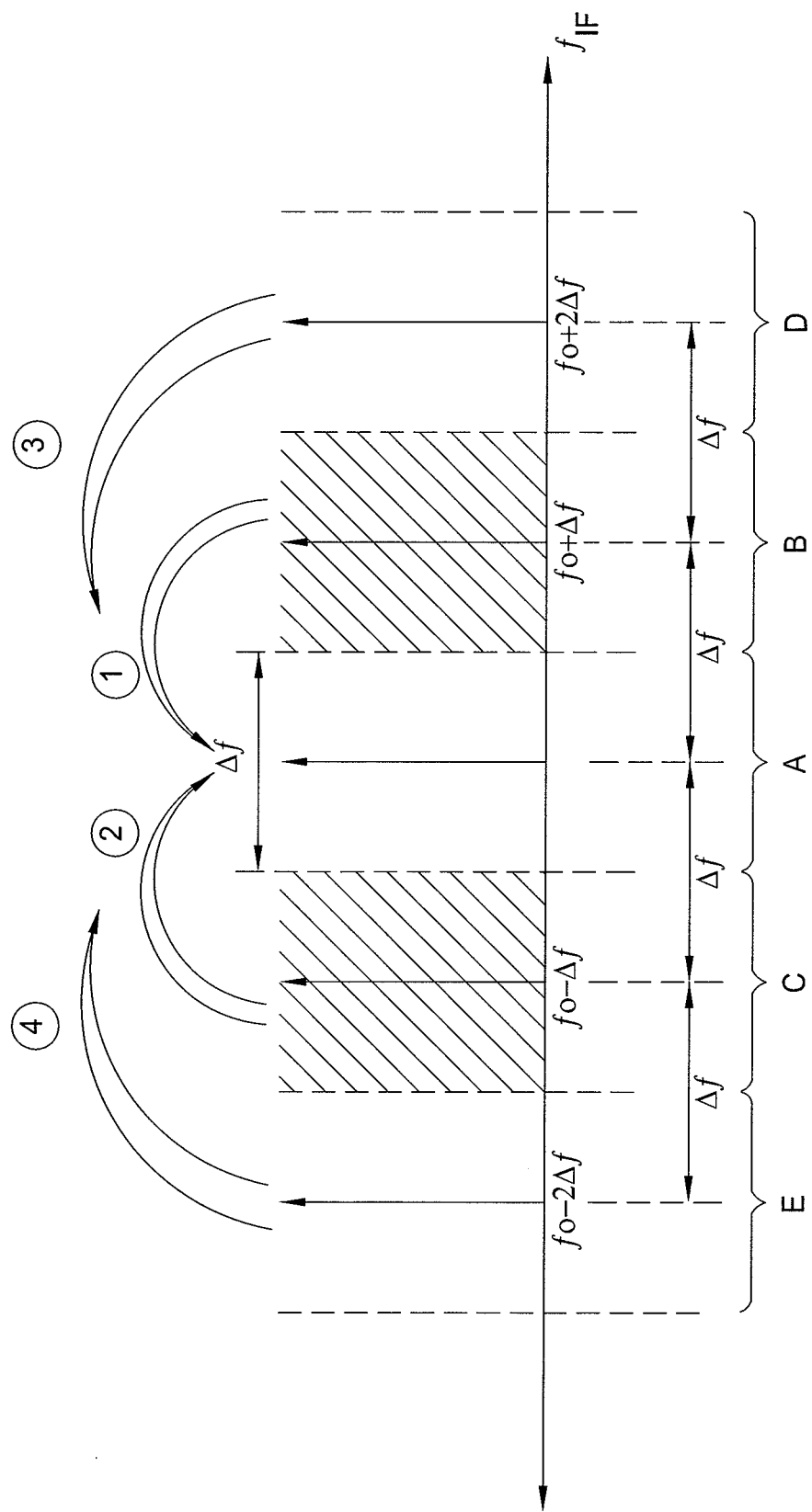
FIG. 8 graphically depicts intermediate frequency spectral region selection suitable for use in understanding the various embodiments.

FIG. 8 graphically depicts intermediate frequency spectral region selection suitable for use in understanding the various embodiments. Specifically, FIG. 8 depicts a plurality of spectral regions denoted as regions A-E. Each of these spectral regions is defined by a respective center frequency within a common frequency range.

Spectral region A is defined as a lock-in spectral region associated with a PLL. Spectral region B is defined as the frequency range immediately above that of spectral region A. Spectral region C is defined as the frequency range immediately below that of spectral region A. Spectral region D is defined as the frequency range immediately above that of spectral region B. Spectral region E is defined as the frequency range immediately below that of spectral region C. Additional spectral regions may also be defined above and below those mentioned. Spectral regions may also be made to overlap such as to allow for a smooth transition from one region into another if so desired. While described as selecting spectral regions in a particular order, it will be appreciated that in various embodiments the order of selecting "next" or subsequent spectral regions for processing by, illustratively, a DDPLL may be changed to reflect any order (though regions proximate the lock-in region are most likely to include the IF signal).

For example, in the case of a 16-QAM system having a center frequency $f_o$, and a frequency lock-in range of approximately +/−20 MHz (i.e., $\Delta f \sim 40$ MHz), spectral region A represents a +/−20 MHz lock-in spectral region associated with a FLL.

If the intermediate frequency IF (i.e., the difference between the optical signal carrier frequency and the LO frequency) falls within $\Delta f$ (i.e., spectral region A around $f_o$), the phase and frequency locking loops will lock and the validation unit will recognize the test pattern. However, if after a pre-defined period of time the various receiver loops are not locking, a corrective frequency offset is applied digitally within any embodiment of a PLL or frequency-lock loop. This offset is preferably chosen to be approximately Δf, such that the IF is shifted into a second spectral region (e.g., region B centered at $f_0+\Delta f$), where locking may now be possible. If after a predefined period of time the signal is still not found, then the IF is shifted to a third spectral region (e.g., region C). This process optionally continues through the fourth spectral region, fifth spectral region and so on.

In one embodiment, the spectral region shifting function is implemented by introducing an artificial frequency offset by inserting another digital mixer into the signal path prior to the PLL, and stepping through as many frequency values as needed to achieve frequency lock. For example, in an embodiment where the IF is 250 MHz, up to seven steps may be necessary to achieve frequency locking (i.e., the 250 MHz IF divided by a locking range of 40 MHz).

The same procedure may be used in connection with discrete frequency shifts $f_{AMB}$, triggered by the fact that the locking loops report successful locking but the validation unit cannot establish the correct signal rotation and/or quadrature inversion. In this case, a corrective frequency shift of $k*f_{AMB}$ instead of approximately $k*\Delta f$ will be digitally applied to the receiver's frequency locking mechanism. For example, for square constellations like QAM, there also exists an ambiguity frequency. That is, whenever the IF is off by integer multiples of RS/4, where RS is the symbol rate, such that subsequent symbols of the constellation are off in phase by integer multiples of $\pi/2$, all algorithms will correctly recover the constellation but the bit sequence will still be wrong. In this case, a frequency correction of integer multiples of RS is applied to arrive at the correct IF estimate.

IF processing utilizes the FLL, which locks using a potentially correct (or incorrect) IF. The correctness of this lock is evaluated using, illustratively, the constellation validator or other mechanism. In response to a determination that the IF used to lock is incorrect (or a lock has not occurred within a predetermined amount of time), the PLL mechanism is adapted to provide a lock within another spectral region.

Figure 9A:
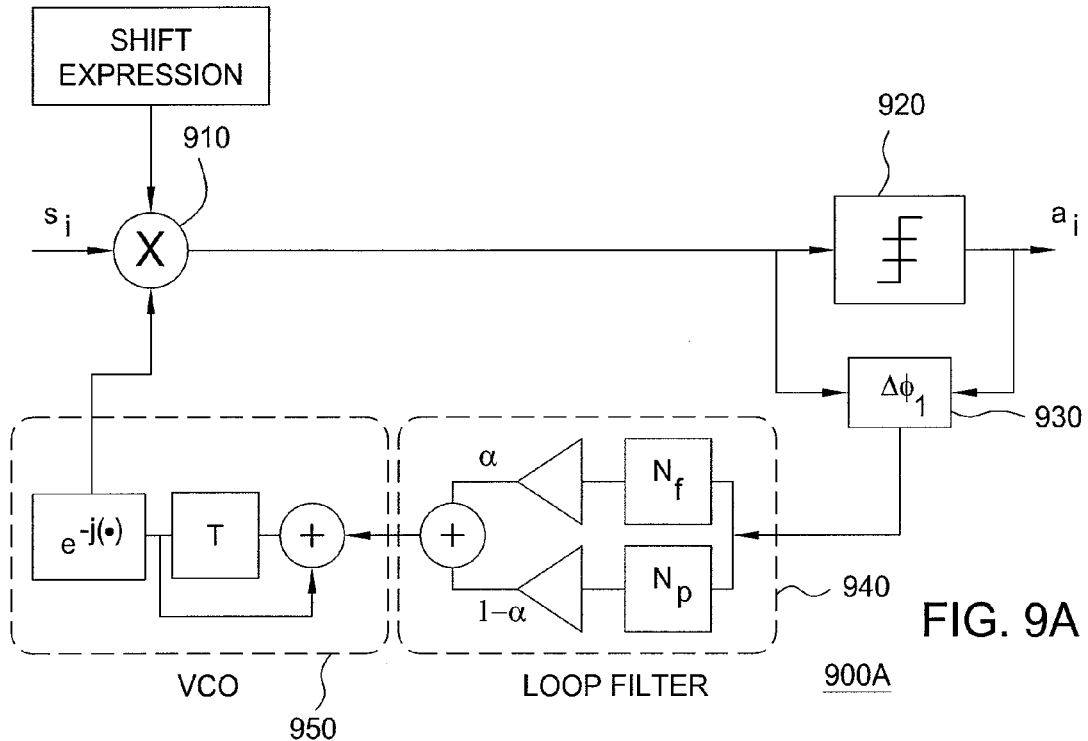
FIG. 9 depicts a high level block diagram of several exemplary decision directed PLLs suitable for use in the various embodiments.
Figure 9B:
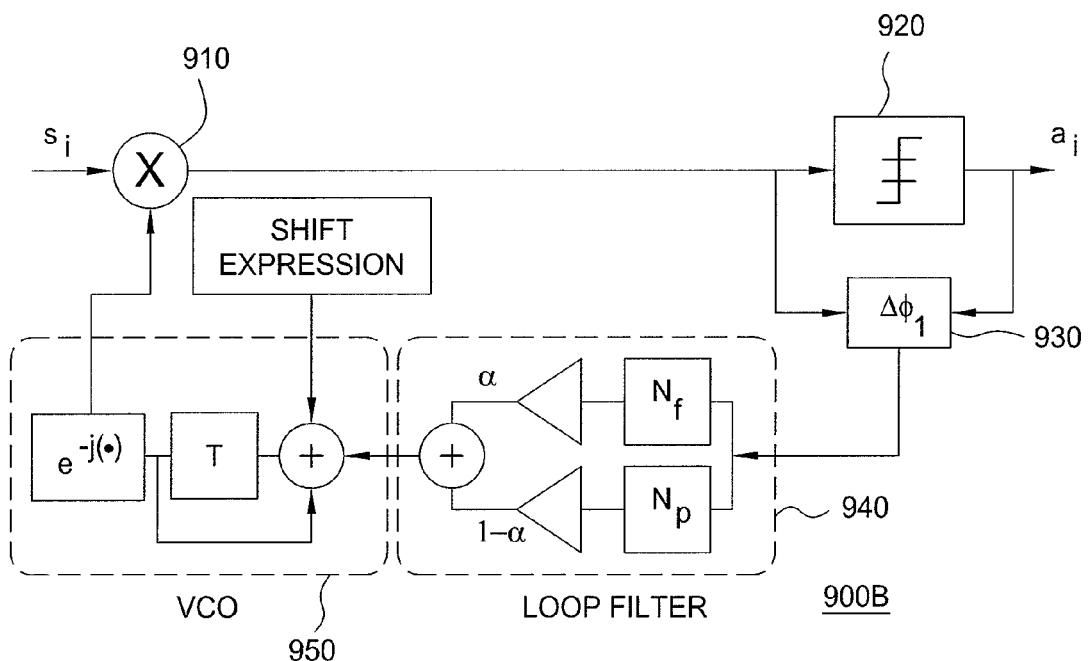
Figure 9C:
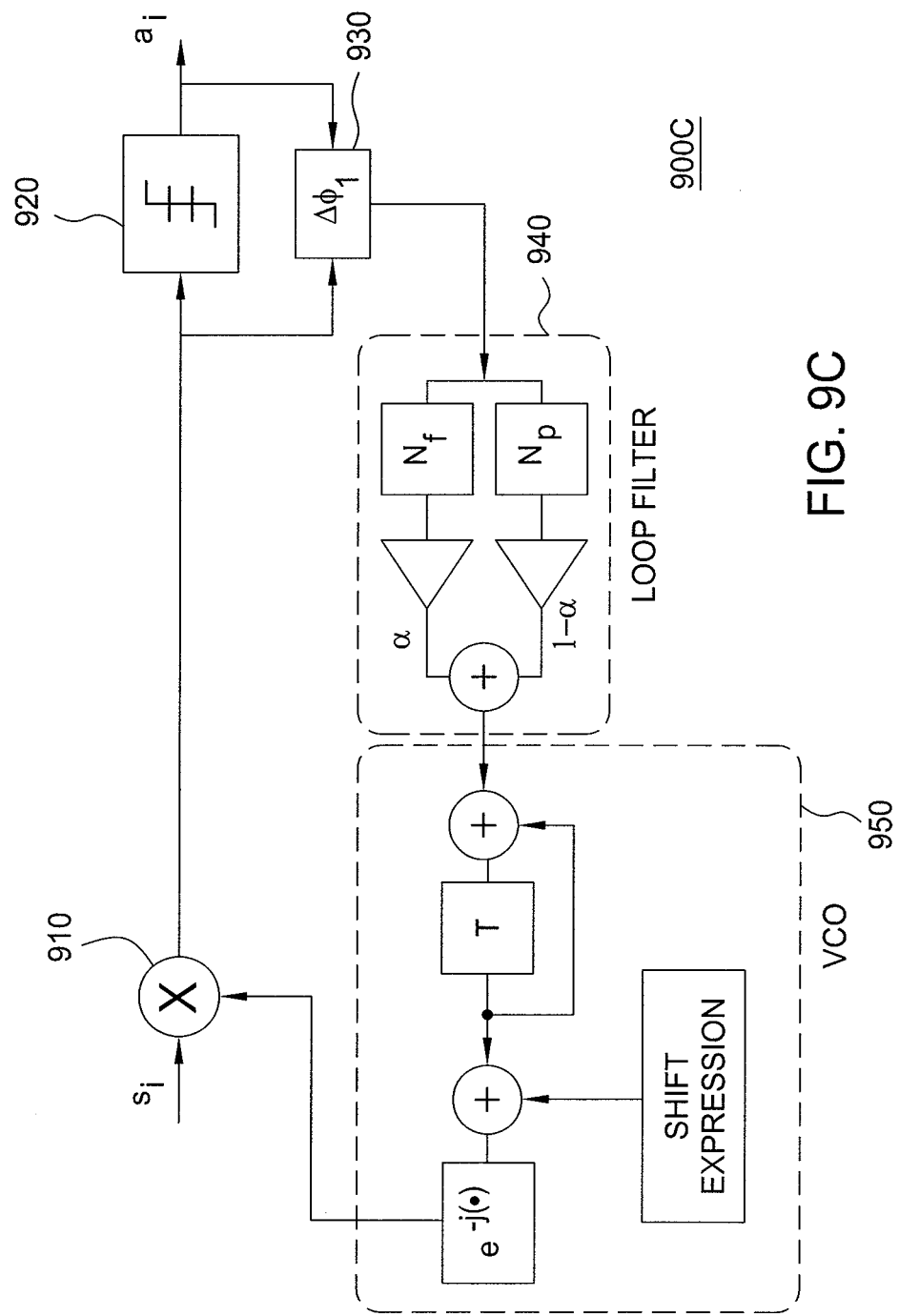

FIG. 9 depicts a high level block diagram of several exemplary decision directed PLLs suitable for use in the various embodiments. Specifically, the DDPLL embodiments of FIG. 9 are formed in substantially the same manner as described above with respect to DDPLL embodiments of FIG. 5, except where indicated. Elements 510-550 described above with respect to FIG. 5A operate in a manner similar to the elements 910-950 described herein with respect to FIG. 9. Major differences, though not all differences, between the FIG. 5A and FIG. 9 embodiments will now be described in more detail.

Generally speaking, each of the DDPLL embodiments described herein with respect to FIG. 9 provides a respective mechanism to shift the IF into the lock-in range or region associated with the DDPLL from a spectral region outside of the lock-in range or region associated with the DDPLL.

FIG. 9A, depicts a DDPLL 900A formed in substantially the same manner as the DDPLL 500 of FIG. 5, except that the initial multiplier 510/910 operates upon a third input stream, denoted as a shift expression. The shift expression is adapted to cause the desired spectral shift. The shift expression in one embodiment is of the form: $e^{-j2\pi fct}$. In another embodiment, the shift expression is of the form: $e^{-2\pi fc\Delta tk}$, where Δt is the sample spacing, and fc is the corrective frequency that is to be applied.

FIG. 9B, depicts a DDPLL 900B formed in substantially the same manner as the DDPLL 500 of FIG. 5, except that an adder within the VCO 550/950 operates upon a third input stream, denoted as a shift expression. The shift expression is adapted to cause the desired spectral shift. The shift expression in one embodiment is of the form: $2\pi f_c \Delta t$.

FIG. 9B, depicts a DDPLL 900B formed in substantially the same manner as the DDPLL 500 of FIG. 5, except that the VCO 550/950 has been modified to include a second adder immediately after the feedback loop to the first adder. The second adder operates upon the feedback signal to the first adder and a stream denoted as a shift expression. The shift expression is adapted to cause the desired spectral shift. The shift expression in one embodiment is of the form: $2\pi f_c t$.

Figure 10:
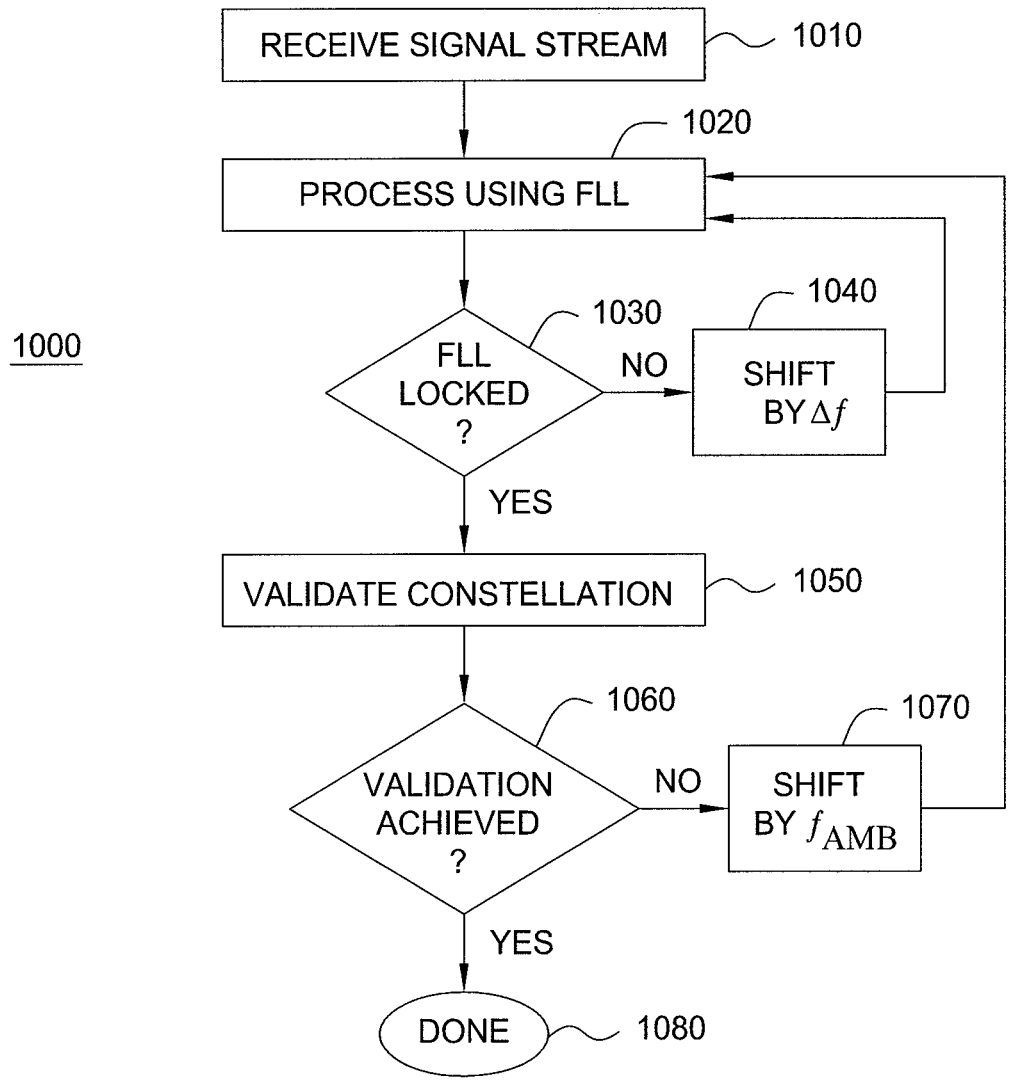
FIG. 10 depicts a flow diagram of a method according to one embodiment.

FIG. 10 depicts a flow diagram of a method according to one embodiment. At step 1010 a signal stream is received. That is, at step 1010 a plurality of samples are received. At step 1020, the received signal stream is processed by the FLL in an attempt to achieve frequency lock.

At step 1030, a determination is made as to whether FLL of the IF signal has been achieved.

If frequency lock has not been achieved (e.g., after a predefined time period), then at step 1040 the spectral region processed by the FLL is shifted by a frequency Δf, illustratively by any of the techniques discussed above with respect to FIG. 9. The method 1000 then proceeds to step 1020 to attempt to establish a FLL condition.

If frequency lock has been achieved, then at step 1050 the constellation corresponding to the locked IF frequency is validated by, illustratively, a constellation validator or other mechanism.

At step 1060, a determination is made as to whether the constellation corresponding to the locked IF frequency has been validated.

If validation has not been achieved, then at step 1070 the spectral region processed by the FLL is shifted by frequency $f_{AMB}$. The method 1000 then proceeds to step 1020 to attempt to establish a FLL condition.

While the various embodiments described herein allow for coherent detection algorithms suitable for optical PDM-QAM signals, these embodiments are also applicable to other modulation formats.

The above-described embodiments provide optical modulation techniques exhibiting high spectral efficiency that are suitable for use within the context of optical transport networks. For example, polarization division multiplexed (PDM) quadrature phase shift keying (QPSK) allows 100 Gb/s to be placed on a 50-GHz WDM grid. Going beyond this spectral efficiency, the above-described 16-level quadrature amplitude modulation (16-QAM) format allows 112 Gb/s on a 25-GHz WDM grid. This format also supports 400 Gb/s on a 100-GHz WDM grid. Modifications to this format discussed above provide additional data rates, as will be appreciated by those skilled in the art and informed by the teachings of the present application.

In one embodiment of the invention, DSP apparatus processing a digitized complex input stream associated with an optical receiver steps through a sequence of filter adaptation algorithm (FAA), starting conditions and picks (a) the fastest-converging path (e.g., if processing data in parallel) or (b) the first outcome that has properly converged.

In another embodiment, a DSP apparatus processes blocks of symbols within a digitized symbol stream $S_i$ representing a received constellation of symbols using a sequence of reference constellations that are differentiated from each other by very small rotation or phase differences (i.e., fine rotation reference constellations). The DSP identifies the closest matching reference constellation and thereby achieves an initial constellation lock condition wherein the received symbols, when mapped to the reference constellation, are substantially aligned with the appropriate decision boundaries.

In this manner, the use of a frequency locked loop (FLL) searching for an IF signal may be avoided. Such processing occurs, for example, at the sample streams emanating from adders 441 in the DSP embodiment depicted in FIG. 4.

In another embodiment, a DSP apparatus processes blocks of symbols within a digitized symbol stream $S_i$ representing a received constellation of symbols by using a FLL to achieve an initial constellation lock condition wherein the received symbols, when mapped to the reference constellation, are substantially aligned with the appropriate decision boundaries. Such processing occurs, for example, at the sample streams emanating from adders 441 in the DSP embodiment depicted in FIG. 4.

The FLL operates to lock onto an expected intermediate frequency (IF) associated with the received constellation.

In one embodiment, if the FLL fails to lock onto the received constellation within one or more predetermined amounts of time, then the spectral region processed by the FLL is incrementally shifted by a frequency $\Delta f$ such that the FLL attempts to lock onto an IF within spectral regions above and/or below the initial spectral region associated with the expected IF. The amount of frequency shift $\Delta f$ may be a portion of the lock range associated with the FLL, the entirety of the lock range of the FLL, an overlapping portion of a different spectral region and so on.

In one embodiment, if the FLL does lock onto a received constellation, then locked constellation is validated using a sequence of reference constellations that are differentiated from each other by relatively large rotation or phase differences (i.e., large rotation reference constellations) to determine if the locked constellation exhibits any of a plurality of possible known rotation and/or quadrature inversion errors. If such errors are found, then the locked IF is shifted by integer multiples of $f_{AMB}$, which varies for different modulation schemes as discussed in more detail above.

After initial constellation lock using the symbols within the digitized symbol stream $S_i$, the symbols within a digitized symbol stream $S_i$ are processed by a decision circuit or data slicer (e.g., element 470 in the DSP embodiment depicted in FIG. 4) to extract therefrom the appropriate constellation data.

In another embodiment, a validation unit or validator compares a constellation of symbols associated with the decision processed samples (e.g., $a_i$) to determine if the corresponding constellation exhibits any of a plurality of possible known rotations and quadrature inversions. This is optionally provided for one or both of non-differentially encoded constellations and differentially encoded constellations. The validator may also be used to verify an FLL-locked constellation, as described above.

In another embodiment, a frequency and phase locking mechanism compares blocks of symbols within a digitized symbol stream $S_i$ representing a received constellation in a least mean squared (LMS) sense to various rotated reference constellations to determine phase angle and IF of the data stream. This can be used either as a stand-alone unit or as a pre-convergence unit to provide starting conditions to improve FLL performance.

An apparatus according to one embodiment for use in an optical receiver comprises a digital signal processor (DSP) implemented in a general purpose computer or a special purpose computer. In various embodiments, such a DSP includes or cooperates with one or more processors, various support circuitry, input-output (I/O) circuitry, memory, communication buses and so on for receiving, processing, providing and/or exchanging information.

The at least one processor may be any conventional processor for executing programs stored in memory. The memory may be any conventional volatile memory (e.g., RAM, DRAM, among others), non-volatile memory (e.g., disk drives, floppy, drives, CDROM, EPROMS, among other computer readable medium) or any other conventional memory device for storing data and various control programs, such as methodology according to the present invention.

The processor cooperates with conventional support circuitry, such as power supplies, clock circuits, cache memory and the like, as well as circuits that assist in executing the various programs and routines, as well as other programs and data. As such, it is contemplated that some of the process steps discussed herein as software processes may be implemented within hardware, for example, as circuitry that cooperates with the processor to perform various steps. The input/output (I/O) circuitry forms an interface between the various functional elements.

Although the DSP described herein is depicted as a general-purpose computer that is programmed to perform various control functions in accordance with the present embodiments, various embodiments may be implemented in hardware such as, for example, an application specific integrated circuit (ASIC) or a field-programmable gate array (FPGA). As such, it is intended that the processes described herein be broadly interpreted as being equivalently performed by software, hardware, or a combination thereof.

The invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a signal bearing medium such as a broadcast medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A digital signal processor (DSP) configured to process complex sample streams derived from a received modulated optical signal, the DSP configured to perform a method comprising:

processing at least one block of symbols within a complex symbol stream to define a received constellation having symbols located within decision boundaries; and verifying the received constellation by comparing the received constellation to each of a sequence of reference constellations having corresponding phase shifts within an angular ambiguity range of the received constellation, wherein the reference constellations comprise reference constellations corresponding to possible rotation errors of the received constellation and reference constellations corresponding to possible inversion errors of the received constellation and the inversion errors comprise one of an in-phase component inversion error and a quadrature phase component inversion error.

2. The method of claim 1, wherein the at least one block of symbols is processed using a frequency locked loop (FLL).

3. The method of claim 2, wherein the reference constellations comprise successive constellations rotated within a lock-in range of the FLL.

4. The method of claim 1, wherein received constellation is defined by determining a one of a sequence of reference constellations exhibiting a least mean square (LMS) error over the at least one block of symbols.

5. The method of claim 1, wherein the received constellation is compared to each of 10 reference constellations.

6. The method of claim 1, wherein the received constellation is sequentially compared to each of a plurality of reference constellations.

7. The method of claim 1, wherein the received complex constellation is compared in parallel to each of a plurality of reference constellations.

8. The method of claim 1, wherein the reference constellations are adapted during operation according to one or more signal quality parameter including noise, distortion and frequency offset.

9. The method of claim 1, wherein the modulated optical signal comprises one of a rectangular QAM, regular or irregular star-QAM, phase shift keying (PSK), amplitude shift keying (ASK) and orthogonal frequency-division multiplexing (OFDM) optical signal.

10. The method of claim 1, wherein the received constellation includes symbols associated with a reference pattern.

11. The method of claim 10, wherein the reference pattern symbols are associated with a bit pattern within a received data stream.

12. The method of claim 10, wherein the bit pattern comprises one or more of a packet check sequence, a frame check sequence, a pseudorandom pattern and a gold code.

13. The method of claim 1, wherein the complex sample streams are derived from a received polarization division multiplexed (PDM) differentially encoded quadrature amplitude modulation (QAM) optical signal.

14. A digital signal processor (DSP) configured to process complex sample streams to find a correct phase angel of a received constellation, the DSP configured to perform a method comprising:
   derotating the received constellation using a frequency locked loop (FLL); and
   comparing the derotated constellation to each of a plurality of reference constellations within an angular ambiguity range of the underlying constellation.

15. The method of claim 14, wherein the complex sample streams are derived from a received polarization division multiplexed (PDM) quadrature amplitude modulation (QAM) optical signal.

16. An optical receiver adapted to receive a polarization division multiplexed (PDM) optical signal, the optical receiver comprising:
   a digital signal processor (DSP) configured to process complex sample streams derived from a received polarization division multiplexed (PDM) optical signal, the DSP configured to perform a method comprising:
   derotating the received constellation using a frequency locked loop (FLL); and
   comparing the derotated constellation to each of a plurality of reference constellations within the angular ambiguity range of the underlying constellation.

17. Optical signal receiver apparatus, comprising:
   a digital signal processor (DSP) configured to process complex sample streams derived from a received optical signal, the DSP configured to perform a method comprising:
   processing at least one block of symbols within a complex symbol stream to define a received constellation having symbols located within decision boundaries; and
   verifying that the received constellation does not exhibit errors by comparing the received constellation to each of a sequence of reference constellations having corresponding phase shifts within an angular ambiguity range of the first constellation, wherein the reference constellations comprise reference constellations corresponding to possible rotation errors of the received constellation and reference constellations corresponding to possible inversion errors of the received constellation and the inversion errors comprise one of an in-phase component inversion error and a quadrature phase component inversion error.

18. A computer readable medium having stored thereon software instructions which, when processed by a computer, perform a method, comprising:
   processing at least one block of symbols within a complex symbol stream to define a received constellation having symbols located within decision boundaries; and
   verifying that the received constellation does not exhibit errors by comparing the received constellation to each of a sequence of reference constellations having corresponding phase shifts within an angular ambiguity range of the first constellation, wherein the reference constellations comprise reference constellations corresponding to possible rotation errors of the received constellation and reference constellations corresponding to possible inversion errors of the received constellation and the inversion errors comprise one of an in-phase component inversion error and a quadrature phase component inversion error.

19. The apparatus of claim 18, wherein the reference constellations are adapted during operation according to one or more signal quality parameter including noise, distortion and frequency offset.

* * * * *

UNITED STATES PATENT AND TRADEMARK OFFICE
CERTIFICATE OF CORRECTION

PATENT NO. : 8,526,831 B2  Page 1 of 1
APPLICATION NO. : 12/642762
DATED : September 3, 2013
INVENTOR(S) : Winzer It is certified that error appears in the above-identified patent and that said Letters Patent is hereby corrected as shown below:

On the Title Page

Item (75) Inventor, should read:
--(75) Inventors: Peter J. Winzer, Aberdeen, NJ (US); Alan H. Gnauck, Middletown, NJ (US)--.

Signed and Sealed this
Twenty-eighth Day of March, 2017

Michelle K. Lee
*Director of the United States Patent and Trademark Office*